US011612999B2

(12) United States Patent
Han et al.

(10) Patent No.: US 11,612,999 B2
(45) Date of Patent: Mar. 28, 2023

(54) SYSTEM AND METHOD FOR MANIPULATING ROBOTIC DEVICE

(71) Applicant: BRAINCO INC., Somerville, MA (US)

(72) Inventors: Bicheng Han, Somerville, MA (US); Jianing Li, Somerville, MA (US); Zhen Lin, Somerville, MA (US); Max Newlon, Somerville, MA (US); Sicong Shan, Somerville, MA (US); Lawrence Franchini, Somerville, MA (US); Hung-Chen Yu, Somerville, MA (US)

(73) Assignee: BRAINCO INC., Somerville, MA (US)

( * ) Notice: Subject to any disclaimer, the term of this patent is extended or adjusted under 35 U.S.C. 154(b) by 577 days.

(21) Appl. No.: 16/789,752

(22) Filed: Feb. 13, 2020

(65) Prior Publication Data
US 2020/0376649 A1  Dec. 3, 2020

Related U.S. Application Data

(60) Provisional application No. 62/854,314, filed on May 29, 2019.

(30) Foreign Application Priority Data

Dec. 12, 2019 (CN) .......................... 201911278371.5

(51) Int. Cl.
*G05B 15/00* (2006.01)
*G05B 19/00* (2006.01)
(Continued)

(52) U.S. Cl.
CPC . *B25J 1/02* (2013.01); *B25J 3/04* (2013.01); *B25J 13/088* (2013.01); *G06F 3/014* (2013.01)

(58) Field of Classification Search
CPC ..... B25J 1/02; B25J 3/04; B25J 13/088; B25J 15/0009; B25J 13/08; B25J 3/00; B25J 13/006; G06F 3/014
See application file for complete search history.

(56) References Cited

U.S. PATENT DOCUMENTS

| 4,972,074 A | * | 11/1990 | Wright | ................. G02B 6/4202 250/221 |
| 11,341,826 B1 | * | 5/2022 | Wiley | ...................... B25J 15/10 |

(Continued)

FOREIGN PATENT DOCUMENTS

| CN | 103170960 A | 6/2013 |
| CN | 103677289 A | 3/2014 |

(Continued)

OTHER PUBLICATIONS

First Office Action issued in counterpart Chinese Patent Application No. 201911278371.5, dated Jul. 26, 2022.

*Primary Examiner* — Harry Y Oh
(74) *Attorney, Agent, or Firm* — Westbridge IP LLC

(57) ABSTRACT

The present disclosure provides a system and a method for manipulating a robotic device. The system includes a human interface device for obtaining information associated with a position and/or movement of a user's finger using the human interface device; and a robotic device for simulating the position and/or movement of the user's finger in real time. The robotic device is in communication with the human interface device. The operating system of the robotic device of the present disclosure can accurately simulate the functions of human hand.

5 Claims, 15 Drawing Sheets

(51) Int. Cl.
*B25J 1/02* (2006.01)
*B25J 3/04* (2006.01)
*G06F 3/01* (2006.01)
*B25J 13/08* (2006.01)

(56) References Cited

U.S. PATENT DOCUMENTS

2016/0059412 A1* 3/2016 Oleynik ............... B62D 57/032
                                                     700/250
2016/0342207 A1* 11/2016 Beran ..................... G06F 3/011
2017/0049583 A1* 2/2017 Belter .................. A61F 2/5044
2017/0269607 A1* 9/2017 Fulop .................... B25J 13/025
2019/0291277 A1* 9/2019 Oleynik ................. B25J 9/1697

FOREIGN PATENT DOCUMENTS

| CN | 105653044 A | 6/2016 |
| CN | 105677036 A | 6/2016 |
| CN | 107127735 A | 9/2017 |
| CN | 206551039 U | 10/2017 |
| CN | 107553499 A | 1/2018 |
| CN | 108972494 A | 12/2018 |
| CN | 109571513 A | 4/2019 |
| CN | 109646156 A | 4/2019 |

* cited by examiner

SYSTEM AND METHOD FOR MANIPULATING ROBOTIC DEVICE

CROSS-REFERENCE TO RELATED APPLICATION

The present disclosure claims the benefits and priority to U.S. Provisional Application No. 62/854,314, filed on May 29, 2019, and Chinese Patent Application No. 201911278371.5, filed on Dec. 12, 2019. All of the aforementioned applications are hereby incorporated by reference in their entireties.

TECHNICAL FIELD

The present disclosure relates to the technical field of robotic devices, and in particular, to a system and a method for manipulating a robotic device.

BACKGROUND

Robotic devices are increasingly being used in a wide-variety of applications, such as healthcare, manufacturing, and user-assistive applications. As the use of robots become more widespread, end-users that are not trained in the programming and control of robotic devices may have a need to use such devices. For example, a disabled person may have a need to use a servant robot to retrieve items or help him or her into and out of bed. However, the disabled person may not have been subjected to the extensive robotic programming training required to control the robot to perform desired tasks.

From an education and learning perspective, it may be desirable to introduce the concepts of robotics, engineering, software programming through customizable, self-learning projects to people of all ages and varied interests. Most commercially available robotic systems are ready-to-use end products and cannot be reprogrammed easily beyond their intended purpose.

Accordingly, a need exists for offering fully customizable learning experience pertaining to robot system designs and programming for people of all ages and varied interests.

Furthermore, other desirable features and characteristics will become apparent from the subsequent detailed description and the appended claim, taken in conjunction with the accompanying drawings and the background of the present disclosure.

SUMMARY

The main objective of the present disclosure is to provide a system and a method for manipulating a robotic device, which aims to provide a system for manipulating the robotic device that can accurately simulate functions of a human hand.

In order to achieve the above objective, the present disclosure provides a system for manipulating a robotic device. The system includes:

a human interface device for obtaining information associated with a position and/or a movement of a user's finger using the human interface device; and a robotic device for simulating the position and/or movement of the user's finger in real time, the robotic device is in communication with the human interface device.

In some embodiments, the human interface device includes a glove sleeved on the robotic device.

In some embodiments, the glove includes a plurality of sensors for obtaining the information associated with the position and/or movement of the user's finger.

In some embodiments, the glove includes a first processor; the robotic device includes a second processor in communication with the first processor of the glove.

In some embodiments, the robotic device includes a robotic arm having a plurality of components similar to the finger.

In some embodiments, the robotic device further includes a movement control mechanism configured to control movements of the plurality of components in response to a signal generated by the second processor.

In some embodiments, the movement control mechanism includes a plurality of swing arms, a plurality of motors for driving the swing arms, and a plurality of traction lines connected to the swing arms; and each traction line, each swing arm and each motor are connected to a corresponding component similar to the finger.

In some embodiments, the robotic device is manufactured by 3D printing technology.

The present disclosure further provides a method for manipulating a robotic device, applied to the system for manipulating the robotic device as described above, including:

obtaining information associated with the position and/or movement of the user's finger using the human interface device through the human interface device; and simulating the position and/or movement of the user's finger in real time through the robotic device.

In some embodiments, the method further includes:

sleeving a glove on the robotic device; and obtaining the information associated with the position and/or movement of the user's finger through the glove.

In technical solutions of the present disclosure, the system includes a human interface device for obtaining information associated with a position and/or movement of a user's finger using the human interface device and a robotic device for simulating the position and/or movement of the user's finger in real time. The human interface device is in communication with the robotic device. The robotic device can analyze the electrical signals sent by the muscles to intelligently adapt and learn the gestures required by each amputee, thereby simulating the functions of a human hand with unprecedented accuracy.

BRIEF DESCRIPTION OF THE DRAWINGS

In order to more clearly illustrate the embodiments of the present disclosure or the technical solutions in the related art, the drawings used in the embodiments or the related art will be briefly described below. Obviously, the drawings in the following description are only some embodiments of the present disclosure. It will be apparent to those skilled in the art that other figures can be obtained from the structures illustrated in the drawings without the inventive effort. In the drawings.

The realization of the objective, functional characteristics, advantages of the present disclosure are further described with reference to the accompanying drawings.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It is to be understood that, all of the directional instructions in the embodiments of the present disclosure (such as up, down, left, right, front, rear . . . ) can only be used for explaining relative position relations, moving condition of the elements under a special form (referring to figures), and so on, if the special form changes, the directional instructions changes accordingly.

In the present disclosure, unless explicitly stated and limited, otherwise the terms "connected", "fixed", etc. should be interpreted broadly. For example, "fixed" can be a fixed connection, a detachable connection, or integrally formed; can be a mechanical connection or an electrical connection; can be directly connected or indirectly connected through an intermediate medium; and can be the internal connection of two elements or the interaction between two elements, unless it is clearly defined. For those ordinary skilled in the art, the specific meanings of the above terms in the present disclosure can be understood according to specific situations.

In addition, the descriptions, such as the "first", the "second" in the embodiment of present disclosure, can only be used for describing the aim of description, and cannot be understood as indicating or suggesting relative importance or impliedly indicating the number of the indicated technical feature. Therefore, the feature indicated by the "first", the "second" can express or impliedly include at least one feature. Besides, the technical solution of each embodiment can be combined with each other, however the technical solution must base on that the ordinary skill in that art can realize the technical solution, when the combination of the technical solutions is contradictory or cannot be realized, it should consider that the combination of the technical solutions does not exist, and is beyond the protection scope of the present disclosure.

The present disclosure provides a system and a method for manipulating a robotic device.

Figure 1:
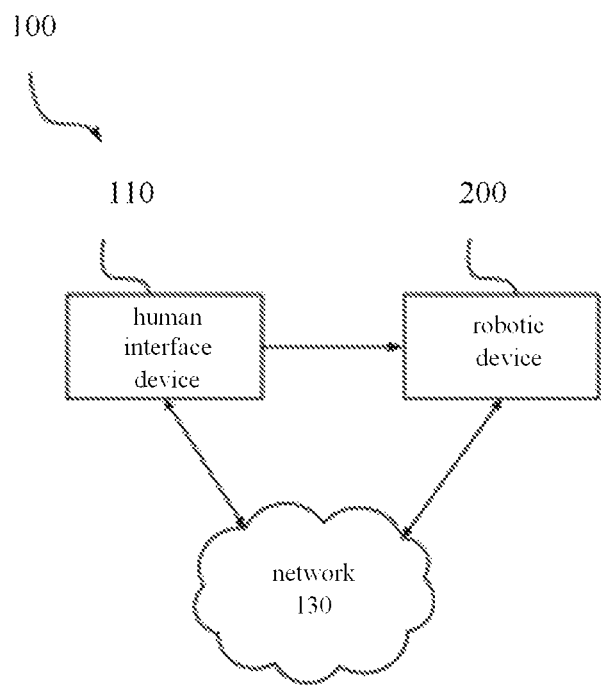
FIG. 1 is a block diagram of a system for manipulating a robotic device according to an embodiment of the present disclosure.
Figure 2:
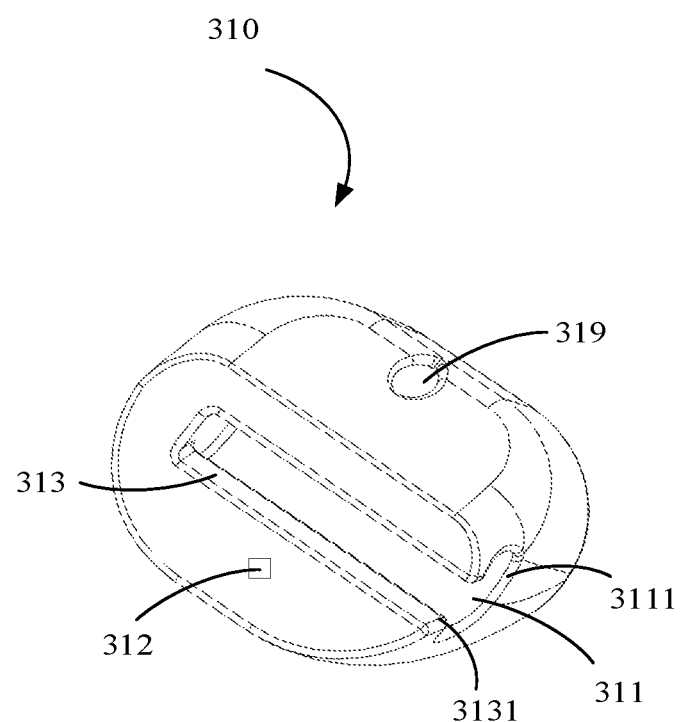
FIG. 2 is a schematic structural diagram of a base piece of a first component of a robotic device according to an embodiment of the present disclosure.
Figure 3:
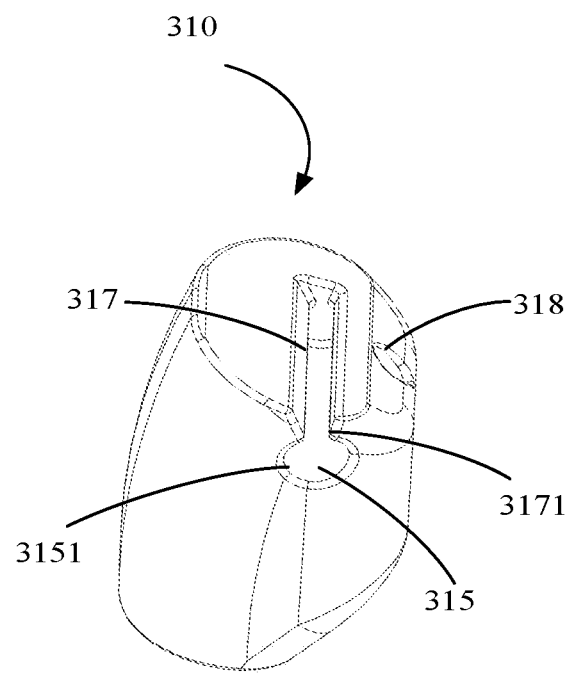
FIG. 3 is a schematic structural view of the base piece shown in FIG. 2 from another angle.
Figure 4:
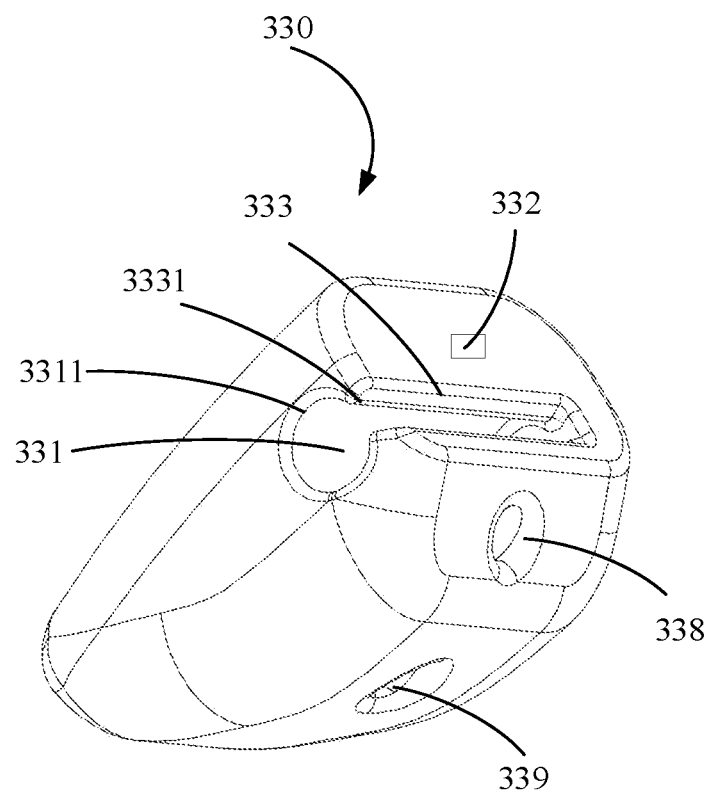
FIG. 4 is a schematic structural diagram of a top piece of a first component of a robotic device according to an embodiment of the present disclosure.

Referring to FIG. 1, FIG. 1 is a block diagram of a system for manipulating a robot device according to an embodiment of the present disclosure. The system 100 for manipulating the robot device includes a human interface device 110 and a robotic device 200. The human interface device 110 may be in communication with the robotic device 200 through a network 130.

In some embodiments, some components of the system 100 may be connected to each other through the network 130. However, in other embodiments, the human interface device 110 may be directly connected to the robotic device 200.

The user operates the robotic device 200 (e.g., a robotic arm) in the human interface device 110 or provides some form of manipulation in a computer-controlled system (e.g., a virtual reality scene controlled by a computer or processor control system), thereby effectively tracking the position and direction of the user's actions or gestures to control the robotic device 200 or the computer control system precisely. For example, the robotic device 200 is designed as much as possible as animated characters, many of which are human or human-like characters.

It can be understood that the system 100 may also include other components and devices.

Although not shown in FIG. 1, the system 100 may further include a database connected to the network 130 or as part of the network 130. In some embodiments, the database may include an Oracle™ database, a Sybase™ database, other relational databases, or a non-relational database. The non-relational databases can be Hadoop™ sequence files, HBase™ or Cassandra™. The database may include a computing component (e.g., a database management system, a database server, etc.), which is configured to receive and process requests for data stored in a storage device of the database. In some embodiments, the database may take the form of a server, a general-purpose computer, or a mainframe computer, or a combination of the above.

In some embodiments, the system 100 may be configured to collect and communicate information received from the human interface device 110 to the robotic device 200 in real time. Based on this information, the robotic device 200 can simulate the position or movement of the human interface device 110 in real time.

It can be understood that other implementations consistent with the embodiments of the present disclosure are also possible.

The human interface device 110 is configured to obtain the information associated with the position and/or movement of a user's finger using the human interface device 110 and the robotic device 200 similar to the human interface device 110.

The human interface device 110 may include a glove (not shown). The glove may include a plurality of sensors for obtaining the information associated with the position and/or movement of the user's finger. The glove may further include a first processor in communication with the robotic device 200.

The sensor may be a multi-channel EMG sensor.

The combination of the sensor and cutting-edge deep learning technology enables us to process high-resolution muscle signals. This allows users to intuitively control commonly used handles as well as customizable hand movements.

The processor is configured to collect information from the sensor and store the information in a database. The information may include information related to the position, orientation, movement, or movement pattern of a gloved finger. In some embodiments, the processor may collect information from multiple sensors to collect information related to the position and movement of each gloved finger.

The robotic device 200 may be configured to simulate the position and/or movement of the user's finger in real time. The robotic device 200 may be similar to a human hand having a plurality of fingers.

The robotic device 200 may include a robotic arm 210. The robotic arm 210 may include a second processor 220 in communication with the first processor of the glove.

In at least one embodiment of the present disclosure, the first processor is wirelessly connected to the second processor 220.

The robotic device 200 may further include a movement control mechanism 212 for controlling the movement of a plurality of fingers in response to a signal generated by the second processor 220.

Understandably, the robotic device 200 may be manufactured using 3D printing technology.

Specifically, the finger portion and the connector may be manufactured and assembled together using 3D printing technology to form a robotic arm 210.

For students of all ages, or for broader educational purposes, certain aspects of the present disclosure can be incorporated into areas of customizable and enhanced learning experiences. In some aspects, students may be required to assemble the robotic device 200 and write software programs to use the robotic device 200 to collect, store, and communicate information from the human interface device 110 (e.g., gloves of the human interface device 110). Some aspects of the present disclosure may also be applied to the field of prosthetics for amputees, such as veterans.

The present disclosure relates to a system and a method for manipulating a robotic device. Specially, embodiments of the present disclosure relate to inventive and unconventional system and method for customizable learning and educational experience through the robotic system.

Referring to FIG. 2 to FIG. 27, in some embodiments of the present disclosure, the robotic device includes a robotic arm 210 and a second processor 220.

In some embodiments, the robotic arm 210 includes a finger portion 211, a palm portion 213, and a wrist portion 215. The finger portion 211 includes a first component 300, a second component 400, a third component 500, a fourth component 600, and a fifth component 700. The wrist portion 215 includes a front wrist 2151 and a rear wrist 2152. The front wrist 2151 and the rear wrist 2152 are both connected to the ends of the palm portion 213. The front wrist 2151 and the back wrist 2152 are enclosed to form a receiving cavity 2153, and the movement control mechanism 212 is received in the receiving cavity 2153.

The front wrist 2151 is provided with at least one protrusion 2154, the rear wrist 2152 is provided with at least one groove 2155, and the protrusion 2154 is received in the groove 2155.

In some embodiments, the glove of the human interface device 110 is sleeved on the finger portion 211 of the robotic arm 210, or sleeved on the finger portion 211 and palm portion 213 of the robotic arm 210, or sleeved on the finger portion 211, the palm portion 213, and the wrist portion 215 of the robotic arm 210.

In some embodiments, the robotic arm 210 may include a movement control mechanism 212 for controlling the movement of components of the robotic arm 210. The movement control mechanism 212 may include a plurality of motors 2122 in communication with the second processor 220, a plurality of swing arms 2121 driven by the motor 2122, a plurality of support bases 2123 supporting a motor 2122, and a plurality of traction lines (not shown).

In some embodiments, the second processor 220 may generate a signal to operate the movement control mechanism 212 so that the movement control mechanism 212 can individually control the movement of one or more fingers of the robotic arm 210.

It can be understood that the number of the motors 2122, the swing arms 2121, the support bases 2123, and the traction lines are all five, which corresponds to the first component 300, the second component 400, the third component 500, the fourth component 600, and the fifth component 700, respectively. The first component 300, the second component 400, the third component 500, the fourth component 600, and the fifth component 700 can move correspondingly under the action of the motor 2122, the swing arm 2121, and the traction line.

In some embodiments, the second processor 220 may generate a signal to operate one or more electric motors 2122 to drive one or more robotic arms 210 to move, and the robotic arm 210 drives one or more components to move through corresponding traction lines.

It can be understood that the movement control mechanism 212 can individually control the movement of one or more components of the robotic arm 210.

Referring to FIGS. 2 to 5, in some embodiments, the first component 300 is similar to a human thumb. The first component 300 may include a base piece 310 and a top piece 330 similar to the human thumb. In some embodiments, the first component 300 may be manufactured using 3D printing technology. The material of the first component 300 is selected from, but not limited to, plastic, metal, ceramic, metal alloy, composite material, rubber, and the like.

The surface of the base piece 310 facing the top piece 330 includes a connecting hole 311 and a connecting hole 313 communicating with the connecting hole 311. The surface of top piece 330 facing the base piece 310 includes a connecting hole 331 and a connecting hole 333 communicating with the connecting hole 331.

In some embodiments, the size of the connecting hole 311 is larger than the size of the connecting hole 313, and the size of the connecting hole 331 is larger than the size of the connecting hole 333.

In some embodiments, the vertical cross section of the connecting hole 311 and the connecting hole 331 is substantially a circular or oval structure. The vertical cross sections of the connecting holes 313 and 333 are substantially rectangular, square, or trapezoidal.

The first component 300 may further include a connector 320 for connecting the base piece 310 and the top piece 330.

In some embodiments, the connector 320 includes a connecting plate 321 and two connecting members 323 provided at two ends of the connecting plate 321. The two connecting members 323 have a shape matching the connecting hole 311 and the connecting hole 331, so that the two connecting members 323 are rotatably received in the connecting hole 311 and the connecting hole 331.

In some embodiments, the connecting hole 311 penetrates one end of the base piece 310 to form an opening 3111. The connecting hole 313 also penetrates one end of the base piece 310 to form an opening 3131 communicating with the opening 3111, so that the connecting member 323 can enter the connecting hole 311 from the opening 3111 and the opening 3131.

In some embodiments, the connecting hole 331 penetrates one end of the base piece 330 to form an opening 3311. The connecting hole 333 also penetrates one end of the base piece 330 to form an opening 3311 communicating with the opening 3331, so that the connecting member 333 can enter the connecting hole 331 from the opening 3311 and the opening 3331.

In some embodiments, the width of the connecting hole 313 and the connecting hole 333 is slightly larger than the thickness of the connecting plate 321, so that the connector 320 is rotatably connected to the base piece 310 and the top piece 330.

Figure 5:
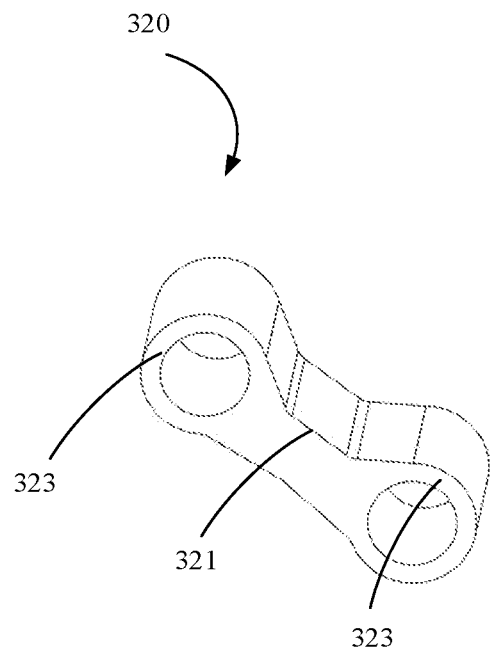
FIG. 5 is a schematic structural diagram of a connector of a robotic device according to an embodiment of the present disclosure.
Figure 6:
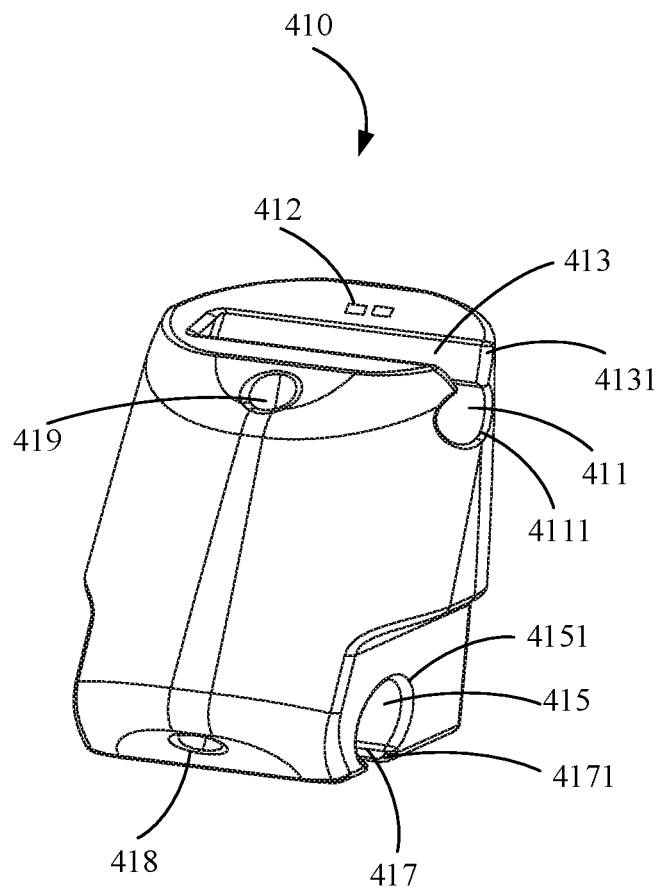
FIG. 6 is a schematic structural diagram of a base piece of a second component of a robotic device according to an embodiment of the present disclosure.
Figure 7:
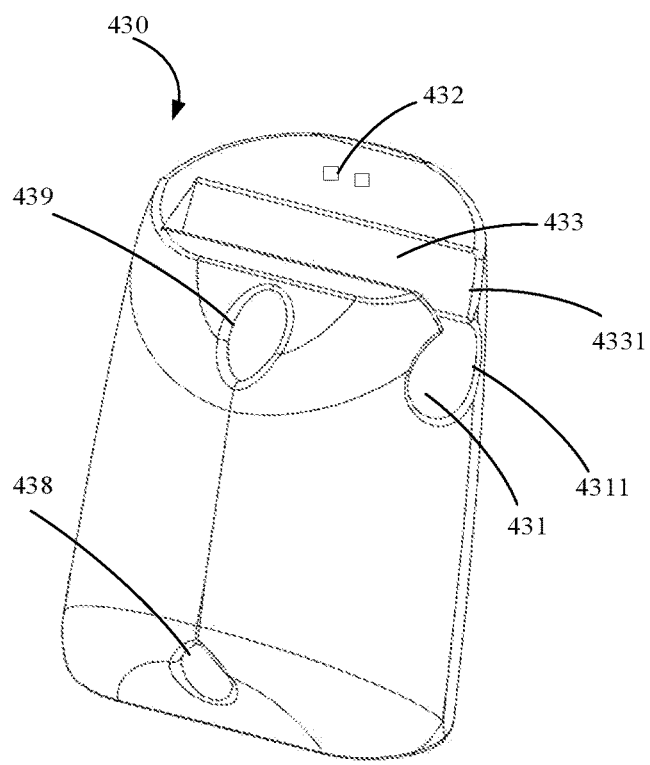
FIG. 7 is a schematic structural diagram of an intermediate piece of a second component of a robotic device according to an embodiment of the present disclosure.

In some embodiments, referring to FIG. 5, after the connector 320 is connected to the base piece 310 and the top piece 330, the connecting plate 321 may be exposed outside the base piece 310 and the top piece 330, so that the base piece 310 and the top piece 330 do not affect each other during the rotation.

In some embodiments, the base piece 310 may further include an identifier 312. The identifier 312 may be configured to identify parts to properly assemble the parts.

In some embodiments, the identifier 312 may be a square cutout formed on a surface of the base piece 310. Although the identifier 312 is a square cutout, other identifying signs or techniques may be used in the present disclosure.

In some embodiments, the identifier 312 is provided on the periphery of the connecting hole 313.

In some embodiments, the top piece 330 may further include an identifier 332. The identifier 332 may be configured to identify parts to properly assemble the parts.

In some embodiments, the identifier 332 may be a square cutout formed on a surface of the top piece 330. Although the identifier 332 is a square cutout, other identifying signs or techniques may be used in the present disclosure.

It can be understood that by using the connector 320 to connect the base piece 310 and the top piece 330, the first component 300 maintains at least three degrees of freedom.

The base piece 310 is provided with a channel, and an inlet 318 and an outlet 319 of the channel both face the palm portion 213.

The top piece 330 is provided with a channel, and an inlet 338 and an outlet 339 of the channel both face the palm portion 213.

Referring to FIGS. 6 to 9, which shows a second component 400 of the robotic device 200 according to an embodiment of the present disclosure. In some embodiments, the second component 400 is similar to a human index finger. The second component 400 may include a base piece 410, an intermediate piece 430, and a top piece 450 similar to a person's index finger. In some embodiments, the 3D printing technology may be used to manufacture the second component 400. The material of the second component 400 includes, but is not limited to, plastic, metal, ceramic, metal alloy, composite material, rubber, and the like.

The surface of the base piece 410 facing the top piece 450 includes a connecting hole 411 and a connecting hole 413 communicating with the connecting hole 411. The surface of top piece 450 facing the base piece 410 includes a connecting hole 451 and a connecting hole 453 communicating with the connecting hole 451. The surface of the intermediate piece 430 facing the base piece 410 includes a connecting hole 431 and a connecting hole 433 communicating with the connecting hole 431. The surface of the intermediate piece 430 facing the top piece 450 includes a connecting hole 435 and a connecting hole 437 communicating with the connecting hole 435.

In some embodiments, the size of the connecting hole 411 is larger than the size of the connecting hole 413, and the size of the connecting hole 451 is larger than the size of the connecting hole 453. The size of the connecting hole 431 is larger than the size of the connecting hole 433. The size of the connecting hole 435 is larger than the size of the connecting hole 437.

In some embodiments, the vertical cross-sections of the connecting hole 411, the connecting hole 451, the connecting hole 431, and the connecting hole 435 are generally a circular or oval structure. The vertical cross sections of the connecting holes 413, 453, 433, and 437 are substantially rectangular, square, or trapezoidal.

Referring to FIG. 5, the second component 400 may further include a connecting member 320 for connecting the base piece 410 and the intermediate piece 430, and a connecting member 320 for connecting the intermediate piece 430 and the top piece 450.

In some embodiments, the two connecting members 323 have a shape matching the connecting hole 411 and the connecting hole 431, so that the two connecting members 323 are rotatably received in the connecting hole 411 and the connecting hole 431.

In some embodiments, the connecting hole 411 penetrates one end of the base piece 410 to form an opening 4111. The connecting hole 413 also penetrates one end of the base piece 410 to form an opening 4131 communicating with the opening 4111, so that the connecting member 323 can enter the connecting hole 411 from the opening 4111 and the opening 4131.

In some embodiments, the connecting hole 431 penetrates one end of the intermediate piece 430 to form an opening 4311. The connecting hole 433 also penetrates one end of the intermediate piece 430 to form an opening 4331 communicating with the opening 4311, so that another connecting member 323 can enter the connecting hole 431 from the opening 4311 and the opening 4331.

In some embodiments, the width of the connecting hole 413 and the connecting hole 433 is slightly larger than the thickness of the connection plate 321, so that the connector 320 is rotatably connected to the base piece 410 and the intermediate piece 430.

In some embodiments, after the connector 320 is connected to the base piece 410 and the intermediate piece 430, the connecting plate 321 may be exposed outside the base piece 410 and the intermediate piece 430 so that the base piece 410 and the intermediate piece 430 do not affect each other during the rotation process.

In some embodiments, the two connecting members 323 have a shape matching the connecting hole 435 and the connecting hole 451, so that the two connecting members 323 are rotatably received in the connecting hole 435 and the connecting hole 451.

In some embodiments, the connecting hole 435 penetrates the other end of the intermediate piece 430 to form an opening 4351, the connecting hole 435 also penetrates the other end of the intermediate piece 430 to form an opening 4353 in communication with the opening 4351, so that the connecting member 323 enters the connecting hole 435 from the opening 4351 and the opening 4353.

In some embodiments, the connecting hole 451 penetrates one end of the top piece 450 to form an opening 4511. The connecting hole 451 also penetrates one end of the top piece 450 to form an opening 4513 communicating with the opening 4511 so that the connecting member 323 can enter the connecting hole 451 from the opening 4511 and the opening 4513.

In some embodiments, the width of the connecting hole 437 and the connecting hole 453 is slightly larger than the thickness of the connection plate 321, so that the connector 320 is rotatably connected to the top piece 450 and the intermediate piece 430.

In some embodiments, after the connector 320 is connected to the top piece 450 and the intermediate piece 430, the connecting plate 321 may be exposed outside the top piece 450 and the intermediate piece 430 so that the top piece 450 and the intermediate piece 430 do not affect each other during the rotation process.

In some embodiments, the base piece 410 may include an identifier 412. The identifier 412 can be used to identify the element to facilitate the correct assembly of the component.

In some embodiments, the identifier 412 may be two square cutouts formed on the surface of the base piece 410. Although the identifier 412 is two square cutouts, other identifying marks or techniques may be used in the present disclosure.

In some embodiments, the intermediate piece 430 may include a recognizer 432 for identifying and distinguishing the intermediate piece 430 and other similar parts of the robotic arm 210 from the intermediate piece 430, thereby facilitating accurate assembly.

In some embodiments, the top piece 450 may include an identifier 452. The identifier 452 can be used to identify the element to facilitate the correct assembly of the component.

In some embodiments, the identifier 452 may be two square cutouts formed on the surface of the top piece 450. Although the identifier 452 is two square cutouts, other identifying marks or techniques may be used in the present disclosure.

In some embodiments, the 3D printing technology may be used to manufacture the base piece 410, the connector 320, the intermediate piece 430, the connector 320, and the top piece 450.

The base piece 410 is provided with a channel, and an inlet 418 and an outlet 419 of the channel both face the palm portion 213.

The intermediate piece 430 is provided with a channel, and an inlet 438 and an outlet 439 of the channel both face the palm portion 213.

The top piece 450 is provided with a channel, and an inlet 458 and an outlet 459 of the channel both face the palm portion 213.

Referring to FIGS. 11 to 14, which shows a third component 500 of a robotic arm 210 according to an embodiment of the present disclosure. In some embodiments, the third component 500 is similar to the middle finger of a human hand. The third component 500 may include a base piece 510, an intermediate piece 530, and a top piece 550 similar to a middle finger of a person. In some embodiments, the third component 500 may be manufactured using 3D printing technology. The material of the third component 500 may include, but is not limited to, plastic, metal, ceramic, metal alloy, composite material, rubber, and the like.

The surface of the base piece 510 facing the top piece 550 includes a connecting hole 511 and a connecting hole 513 communicating with the connecting hole 511. The surface of the top piece 550 facing the base piece 510 includes a connecting hole 551 and a connecting hole 553 communicating with the connecting hole 551. The surface of the intermediate piece 530 facing the base piece 510 includes a connecting hole 531 and a connecting hole 533 communicating with the connecting hole 531. The surface of the intermediate piece 530 facing the top piece 550 includes a connecting hole 535 and a connecting hole 537 communicating with the connecting hole 535.

In some embodiments, the size of the connecting hole 511 is larger than the size of the connecting hole 513, and the size of the connecting hole 551 is larger than the size of the connecting hole 553. The size of the connecting hole 531 is larger than the size of the connecting hole 533. The size of the connecting hole 535 is larger than the size of the connecting hole 537.

In some embodiments, the vertical cross section of the connecting hole 511, the connecting hole 551, the connecting hole 531, and the connecting hole 535 is substantially a circular or oval structure. The vertical cross sections of the connecting hole 513, the connecting hole 553, the connecting hole 533, and the connecting hole 537 are substantially rectangular, square, or trapezoidal.

Referring to FIG. 5, the third component 500 may further include a connector 320 for connecting the base piece 510 and the intermediate piece 530, and a connector 320 for connecting the intermediate piece 530 and the top member 550.

In some embodiments, the connector 320 includes a connecting plate 321 and two connecting members 323 provided at two ends of the connecting plate 321. The two connecting members 323 have a shape matching the connecting hole 511 and the connecting hole 531, so that the two connecting members 323 are rotatably received in the connecting hole 511 and the connecting hole 531.

In some embodiments, the connecting hole 511 penetrates one end of the base piece 510 to form an opening 5111. The connecting hole 513 also penetrates one end of the base piece 510, thereby forming an opening 5131 communicating with the opening 5111, so that the connecting member 323 enters the connecting hole 511 from the opening 5111 and the opening 5131.

In some embodiments, the connecting hole 531 penetrates one end of the intermediate piece 530 to form an opening 5311. The connecting hole 533 also penetrates one end of the intermediate piece 530 to form an opening 5331 communicating with the opening 5311 so that another connecting member 323 can enter the connecting hole 531 from the opening 5311 and the opening 5331.

In some embodiments, the width of the connecting hole 513 and the connecting hole 533 is slightly larger than the thickness of the connection plate 321, so that the connector 320 is rotatably connected to the base piece 510 and the intermediate piece 530.

In some embodiments, after the connector 320 is connected to the base piece 510 and the intermediate piece 530, the connecting plate 321 may be exposed outside the base piece 510 and the intermediate piece 530 so that the base piece 510 and the intermediate piece 530 do not affect each other during the rotation.

In some embodiments, the two connecting members 323 have a shape matching the connecting hole 535 and the connecting hole 551, so that the two connecting members 323 are rotatably received in the connecting hole 535 and the connecting hole 551.

In some embodiments, the connecting hole 535 penetrates the other end of the intermediate piece 530 to form an opening 5351. The connecting hole 537 also penetrates the other end of the intermediate piece 530, so as to form an opening 5353 in communication with the opening 5371, so that the connecting member 323 enters the connecting hole 535 from the opening 5351 and the opening 5371.

In some embodiments, the connecting hole 551 penetrates one end of the top piece 550 to form an opening 5511. The connecting hole 553 also penetrates one end of the top piece 550, so as to form an opening 5531 in communication with the opening 5511, so that the connecting member 323 can enter the connecting hole 551 from the opening 5511 and the opening 5531.

In some embodiments, the width of the connecting hole 537 and the connecting hole 553 is slightly larger than the thickness of the connection plate 551, so that the connector 320 is rotatably connected with the top piece 550 and the intermediate piece 530.

In some embodiments, after the connector 320 is connected to the top piece 550 and the intermediate piece 530, the connecting plate 551 may be exposed outside the top piece 550 and the intermediate piece 530 so that the top piece 550 and the intermediate piece 530 do not affect each other during the rotation.

In some embodiments, the base piece 510 may include an identifier 512 for identifying components to properly install the components.

In some embodiments, the identifier 512 may be three square cutouts formed on the surface of the base piece 510. Although the identifier 512 includes three square cutouts, other identifying marks or techniques may be used in the present disclosure.

In some embodiments, the intermediate piece 530 may include a recognizer 532. The recognizer 532 is used to identify and distinguish the intermediate piece 530 and other parts of the robotic arm 210 similar to the intermediate piece 530, thereby facilitating accurate assembly.

In some embodiments, the top piece 550 may include an identifier 552 for identifying components to properly install the components.

In some embodiments, the identifier 552 may be three square cutouts formed on a surface of the top piece 550. Although the identifier 552 includes three square cutouts, other identifying marks or techniques may be used in the present disclosure.

In some embodiments, the 3D printing technology may be used to manufacture the base piece 510, the connector 320, the intermediate piece 530, the connector 320, and the top piece 550.

The base piece 510 is provided with a channel, and an inlet 518 and an outlet 519 of the channel both face the palm portion 213.

The intermediate piece 530 is provided with a channel, and the inlet 538 and the outlet 539 of the channel both face the palm portion 213.

The top piece 550 is provided with a channel, and an inlet 558 and an outlet 559 of the channel both face the palm portion 213.

Referring to FIGS. 15 to 18, which shows a fourth component 600 of a robotic arm 210 according to an embodiment of the present disclosure. In some embodiments, the fourth component 600 is similar to a ring finger of a person. The fourth component 600 may include a base piece 610, an intermediate piece 630, and a top piece 650 similar to a person's ring finger. In some embodiments, the fourth component 600 may be manufactured using 3D printing technology. The material of the fourth component 600 may include, but is not limited to, plastic, metal, ceramic, metal alloy, composite material, rubber, and the like.

The surface of the base piece 610 facing the top piece 650 includes a connecting hole 611 and a connecting hole 613 communicating with the connecting hole 611. The surface of the top piece 650 facing the base piece 610 includes a connecting hole 651 and a connecting hole 653 communicating with the connecting hole 651. The surface of the intermediate piece 630 facing the base piece 610 includes a connecting hole 631 and a connecting hole 633 communicating with the connecting hole 631. The surface of the intermediate piece 630 facing the top piece 650 includes a connecting hole 635 and a connecting hole 637 communicating with the connecting hole 635.

In some embodiments, the size of the connecting hole 611 is larger than the size of the connecting hole 613, and the size of the connecting hole 651 is larger than the size of the connecting hole 653. The size of the connecting hole 631 is larger than the size of the connecting hole 633. The size of the connecting hole 635 is larger than the size of the connecting hole 637.

In some embodiments, the vertical cross section of the connecting hole 611, the connecting hole 651, the connecting hole 631, and the connecting hole 635 is substantially a circular or oval structure. The vertical cross sections of the connecting hole 613, the connecting hole 653, the connecting hole 633, and the connecting hole 637 are substantially rectangular, square, or trapezoidal.

Referring to FIG. 5, the fourth component 600 may further include a connector 320 for connecting the base piece 610 and the intermediate piece 630, and a connector 320 for connecting the intermediate piece 630 and the top member 650.

In some embodiments, the two connecting members 323 have a shape matching the connecting hole 611 and the connecting hole 631, so that the two connecting members 323 are rotatably received in the connecting hole 611 and the connecting hole 631.

In some embodiments, the connecting hole 611 penetrates one end of the base piece 610 to form an opening 6111. The connecting hole 613 also penetrates one end of the base piece 610, thereby forming an opening 6131 communicating with the opening 6111, so that the connecting member 323 enters the connecting hole 611 from the opening 6111 and the opening 6131.

In some embodiments, the connecting hole 631 penetrates one end of the intermediate piece 630 to form an opening 6311. The connecting hole 633 also penetrates one end of the intermediate piece 630 to form an opening 6331 communicating with the opening 6311 so that another connecting member 323 can enter the connecting hole 631 from the opening 6311 and the opening 6331.

In some embodiments, the width of the connecting hole 613 and the connecting hole 633 is slightly larger than the thickness of the connection plate 321, so that the connector 320 is rotatably connected to the base piece 610 and the intermediate piece 630.

In some embodiments, after the connector 320 is connected to the base piece 610 and the intermediate piece 630, the connecting plate 321 may be exposed outside the base piece 610 and the intermediate piece 630 so that the base piece 610 and the intermediate piece 630 do not affect each other during the rotation.

In some embodiments, the two connecting members 323 have a shape matching the connecting hole 635 and the connecting hole 651, so that the two connecting members 323 are rotatably received in the connecting hole 635 and the connecting hole 651.

In some embodiments, the connecting hole 635 penetrates the other end of the intermediate piece 630 to form an opening 6351. The connecting hole 637 also penetrates the other end of the intermediate piece 630, so as to form an opening 6353 in communication with the opening 6371, so that the connecting member 323 enters the connecting hole 635 from the opening 6351 and the opening 6371.

In some embodiments, the connecting hole 651 penetrates one end of the top piece 650 to form an opening 6611. The connecting hole 653 also penetrates one end of the top piece 650, so as to form an opening 6631 in communication with the opening 6611, so that the connecting member 323 can enter the connecting hole 651 from the opening 6611 and the opening 6631.

In some embodiments, the width of the connecting hole 637 and the connecting hole 653 is slightly larger than the thickness of the connection plate 651, so that the connector 320 is rotatably connected with the top piece 650 and the intermediate piece 630.

In some embodiments, after the connector 320 is connected to the top piece 650 and the intermediate piece 630, the connecting plate 651 may be exposed outside the top piece 650 and the intermediate piece 630 so that the top piece 650 and the intermediate piece 630 do not affect each other during the rotation.

In some embodiments, the base piece 610 may include an identifier 612 for identifying components to properly install the components.

In some embodiments, the identifier 612 may be four square cutouts formed on the surface of the base piece 610. Although the identifier 612 includes four square cutouts, other identifying marks or techniques may be used in the present disclosure.

In some embodiments, the intermediate piece 630 may include a recognizer 632. The recognizer 632 is used to identify and distinguish the intermediate piece 630 and other parts of the robotic arm 210 similar to the intermediate piece 630, thereby facilitating accurate assembly.

In some embodiments, the top piece 650 may include an identifier 652 for identifying components to properly install the components.

In some embodiments, the identifier 652 may be four square cutouts formed on a surface of the top piece 650. Although the identifier 652 includes four square cutouts, other identifying marks or techniques may be used in the present disclosure.

In some embodiments, the 3D printing technology may be used to manufacture the base piece 610, the connector 320, the intermediate piece 630, the connector 320, and the top piece 650.

The base piece 610 is provided with a channel, and an inlet 618 and an outlet 619 of the channel both face the palm portion 213.

The intermediate piece 630 is provided with a channel, and the inlet 638 and the outlet 639 of the channel both face the palm portion 213.

The top piece 650 is provided with a channel, and an inlet 658 and an outlet 659 of the channel both face the palm portion 213.

Referring to FIGS. 17 to 22, which shows a fifth component 700 of a robotic arm 210 according to an embodiment of the present disclosure. In some embodiments, the fifth component 700 is similar to a little finger of a person. The fifth component 700 may include a base piece 710, an intermediate piece 730, and a top piece 750 similar to a person's little finger. In some embodiments, the fifth component 700 may be manufactured using 3D printing technology. The material of the fifth component 700 may include, but is not limited to, plastic, metal, ceramic, metal alloy, composite material, rubber, and the like.

The surface of the base piece 710 facing the top piece 750 includes a connecting hole 711 and a connecting hole 713 communicating with the connecting hole 711. The surface of the top piece 750 facing the base piece 710 includes a connecting hole 751 and a connecting hole 753 communicating with the connecting hole 751. The surface of the intermediate piece 730 facing the base piece 710 includes a connecting hole 731 and a connecting hole 733 communicating with the connecting hole 731. The surface of the intermediate piece 730 facing the top piece 750 includes a connecting hole 735 and a connecting hole 737 communicating with the connecting hole 735.

In some embodiments, the size of the connecting hole 711 is larger than the size of the connecting hole 713, and the size of the connecting hole 751 is larger than the size of the connecting hole 753. The size of the connecting hole 731 is larger than the size of the connecting hole 733. The size of the connecting hole 735 is larger than the size of the connecting hole 737.

In some embodiments, the vertical cross section of the connecting hole 711, the connecting hole 751, the connecting hole 731, and the connecting hole 735 is substantially a circular or oval structure. The vertical cross sections of the connecting hole 713, the connecting hole 753, the connecting hole 733, and the connecting hole 737 are substantially rectangular, square, or trapezoidal.

Referring to FIG. 5, the fifth component 700 may further include a connector 320 for connecting the base piece 710 and the intermediate piece 730, and a connector 320 for connecting the intermediate piece 730 and the top member 750.

In some embodiments, the connector 320 includes a connecting plate 321 and two connecting members 323 provided at two ends of the connecting plate 321. The two connecting members 323 have a shape matching the connecting hole 711 and the connecting hole 731, so that the two connecting members 323 are rotatably received in the connecting hole 711 and the connecting hole 731.

In some embodiments, the connecting hole 711 penetrates one end of the base piece 710 to form an opening 7111. The connecting hole 713 also penetrates one end of the base piece 710, thereby forming an opening 7131 communicating with the opening 7111, so that the connecting member 323 enters the connecting hole 711 from the opening 7111 and the opening 7131.

In some embodiments, the connecting hole 731 penetrates one end of the intermediate piece 730 to form an opening 7311. The connecting hole 733 also penetrates one end of the intermediate piece 730 to form an opening 7331 communicating with the opening 7311 so that another connecting member 323 can enter the connecting hole 731 from the opening 7311 and the opening 7331.

In some embodiments, the width of the connecting hole 713 and the connecting hole 733 is slightly larger than the thickness of the connection plate 321, so that the connector 320 is rotatably connected to the base piece 710 and the intermediate piece 730.

In some embodiments, after the connector 320 is connected to the base piece 710 and the intermediate piece 730, the connecting plate 321 may be exposed outside the base piece 710 and the intermediate piece 730 so that the base piece 710 and the intermediate piece 730 do not affect each other during the rotation.

In some embodiments, the two connecting members 323 have a shape matching the connecting hole 735 and the connecting hole 751, so that the two connecting members 323 are rotatably received in the connecting hole 735 and the connecting hole 751.

In some embodiments, the connecting hole 735 penetrates the other end of the intermediate piece 730 to form an opening 7351. The connecting hole 737 also penetrates the other end of the intermediate piece 730, so as to form an opening 7353 in communication with the opening 7371, so that the connecting member 323 enters the connecting hole 735 from the opening 7351 and the opening 7371.

In some embodiments, the connecting hole 751 penetrates one end of the top piece 750 to form an opening 7711. The connecting hole 753 also penetrates one end of the top piece 750, so as to form an opening 7731 in communication with the opening 7711, so that the connecting member 323 can enter the connecting hole 751 from the opening 7711 and the opening 7731.

In some embodiments, the width of the connecting hole 737 and the connecting hole 753 is slightly larger than the thickness of the connection plate 751, so that the connector 320 is rotatably connected with the top piece 750 and the intermediate piece 730.

In some embodiments, after the connector 320 is connected to the top piece 750 and the intermediate piece 730, the connecting plate 751 may be exposed outside the top piece 750 and the intermediate piece 730 so that the top piece 750 and the intermediate piece 730 do not affect each other during the rotation.

In some embodiments, the base piece 710 may include an identifier 712 for identifying components to properly install the components.

In some embodiments, the identifier 712 may be five square cutouts formed on the surface of the base piece 710. Although the identifier 712 includes five square cutouts, other identifying marks or techniques may be used in the present disclosure.

In some embodiments, the intermediate piece 730 may include a recognizer 732. The recognizer 732 is used to identify and distinguish the intermediate piece 730 and other parts of the robotic arm 210 similar to the intermediate piece 730, thereby facilitating accurate assembly.

In some embodiments, the top piece 750 may include an identifier 752 for identifying components to properly install the components.

In some embodiments, the identifier 752 may be five square cutouts formed on a surface of the top piece 750. Although the identifier 752 includes five square cutouts, other identifying marks or techniques may be used in the present disclosure.

In some embodiments, the 3D printing technology may be used to manufacture the base piece 710, the connector 320, the intermediate piece 730, the connector 320, and the top piece 750.

The base piece 710 is provided with a channel, and an inlet 718 and an outlet 719 of the channel both face the palm portion 213.

The intermediate piece 730 is provided with a channel, and the inlet 738 and the outlet 739 of the channel both face the palm portion 213.

The top piece 750 is provided with a channel, and an inlet 758 and an outlet 759 of the channel both face the palm portion 213.

The palm portion 213 includes a front palm 217 and a rear palm 218. The front palm 217 is provided with a connecting groove 2171 corresponding to an area of the first component 300, a connecting groove 2173 corresponding to an area of the second component 400, a connecting groove 2175 corresponding to an area of the third component 500, a connecting groove 2177 corresponding to an area of the fourth component 600, and a connecting groove 2179 corresponding to an area of the fifth component 700.

In some embodiments, the connecting groove 2171 is formed on a joint of the palm portion 213 corresponding to the first component 300. The first component 300 is installed in the connecting groove 2171 located in the joint area of the thumb.

A through hole 2172 is defined in the periphery of the connecting groove 2171, and the through hole 2172 is in communication with the receiving space formed by the front palm 217 and the rear palm 2132 and the receiving cavity 2153 formed by the front wrist 2151 and the rear wrist 2152.

The size of the connecting groove 2171 matches the size of the connecting member 323.

In some embodiments, the connecting groove 2173 is formed on a joint of the palm portion 213 corresponding to the second component 400. The second component 400 is installed in the connecting groove 2173 located in the joint area of the thumb.

A through hole 2174 is defined in the periphery of the connecting groove 2173. The through hole 2174 is in communication with the receiving space formed by the front palm 217 and the rear palm 2132 and the receiving cavity 2153 formed by the front wrist 2151 and the rear wrist 2152.

In some embodiments, the connecting groove 2175 is formed on a joint of the palm portion 213 corresponding to the third component 500. The third component 500 is installed in the connecting groove 2175 located in the joint area of the thumb.

A through hole 2176 is defined in the periphery of the connecting groove 2175. The through hole 2176 is in communication with the receiving space formed by the front palm 217 and the rear palm 2132 and the receiving cavity 2153 formed by the front wrist 2151 and the rear wrist 2152.

In some embodiments, the connecting groove 2177 is formed on a joint of the palm portion 213 corresponding to the fourth component 600. The fourth component 600 is installed in the connecting groove 2177 located in the joint area of the thumb.

A through hole 2178 is defined in the periphery of the connecting groove 2177. The through hole 2178 is in communication with the receiving space formed by the front palm 217 and the rear palm 2132 and the receiving cavity 2153 formed by the front wrist 2151 and the rear wrist 2152.

In some embodiments, the connecting groove 2179 is formed on a joint of the palm portion 213 corresponding to the fifth component 700. The fifth component 700 is installed in the connecting groove 2179 located in the joint area of the thumb.

A through hole 2120 is defined in the periphery of the connecting groove 2179. The through hole 2120 is in communication with the receiving space formed by the front palm 217 and the rear palm 2132 and the receiving cavity 2153 formed by the front wrist 2151 and the rear wrist 2152.

A surface of the front palm 217 facing away from the first component 300 is provided with a sub-groove 2124 in a region corresponding to the second component 400, a sub-groove 2125 in a region corresponding to the third component 500, a sub-groove 2126 in a region corresponding to the fourth component 600, and a sub-groove 2127 in a region corresponding to the fifth component 700.

A surface of the back palm 2132 facing the front palm 217 is provided with a sub-groove 2181 in a region corresponding to the second component 400, a sub-groove 2182 in a region corresponding to the third component 500, a sub-groove 2183 in a region corresponding to the fourth component 600, and a sub-groove 2184 in a region corresponding to the fifth component 700.

The sub-groove 2124 and the sub-groove 2181 together form a groove for receiving the connecting member 323 of the second component 400. The groove has a size matching the connecting member 323, and the connecting member 323 is rotatably received in the groove.

The sub-groove 2125 and the sub-groove 2182 together form a groove for receiving the connecting member 323 of the third component 500. The groove has a size matching the connecting member 323, and the connecting member 323 is rotatably received in the groove.

The sub-groove 2126 and the sub-groove 2183 together form a groove for receiving the connecting member 323 of the fourth component 600. The groove has a size matching the connecting member 323, and the connecting member 323 is rotatably received in the groove.

The sub-groove 2127 and the sub-groove 2184 together form a groove for receiving the connecting member 323 of the fifth component 700. The groove has a size matching the connecting member 323, and the connecting member 323 is rotatably received in the groove.

A connecting hole 315 and a connecting hole 317 communicating with the connecting hole 315 are defined on a surface of the base piece 310 of the first component 300 facing the palm portion 213. In some embodiments, the size of the connecting hole 315 is larger than the size of the connecting hole 317. The size of the vertical section of the connecting hole 315 is substantially circular or oval, and the size of the vertical section of the connecting hole 317 is approximately rectangular, square, or trapezoidal.

In some embodiments, the connecting hole 315 and the connecting hole 317 of the base piece 310 both penetrate the surface of the base piece 310 away from the surface of the second component 400, thereby forming an opening 3151 and an opening 3171.

A connecting hole 415 and a connecting hole 417 communicating with the connecting hole 415 are defined on a surface of the base piece 410 of the second component 400 facing the palm portion 213. In some embodiments, the size of the connecting hole 415 is larger than the size of the connecting hole 417. The size of the vertical section of the connecting hole 415 is substantially circular or oval, and the size of the vertical section of the connecting hole 417 is approximately rectangular, square, or trapezoidal.

A connecting hole 515 and a connecting hole 517 communicating with the connecting hole 515 are defined on a surface of the base piece 510 of the third component 500 facing the palm portion 213. In some embodiments, the size of the connecting hole 515 is larger than the size of the connecting hole 517. The size of the vertical section of the connecting hole 515 is substantially circular or oval, and the size of the vertical section of the connecting hole 517 is approximately rectangular, square, or trapezoidal.

A connecting hole 615 and a connecting hole 617 communicating with the connecting hole 615 are defined on a surface of the base piece 610 of the fourth component 600 facing the palm portion 213. In some embodiments, the size of the connecting hole 615 is larger than the size of the connecting hole 617. The size of the vertical section of the connecting hole 615 is substantially circular or oval, and the size of the vertical section of the connecting hole 617 is approximately rectangular, square, or trapezoidal.

A connecting hole 715 and a connecting hole 717 communicating with the connecting hole 715 are defined on a surface of the base piece 710 of the fourth component 700 facing the palm portion 213. In some embodiments, the size of the connecting hole 715 is larger than the size of the connecting hole 717. The size of the vertical section of the connecting hole 715 is substantially circular or oval, and the size of the vertical section of the connecting hole 717 is approximately rectangular, square, or trapezoidal.

The palm portion 213 further includes a plurality of connectors 320. Each connector 320 includes a connecting plate 321 and two connecting members 323 provided at two ends of the connecting plate 321. The size of the vertical cross section of the connecting member 323 is substantially circular or oval.

In some embodiments, the number of the connectors 320 is four.

A connecting member 323 of a connector 320 is rotatably received in a groove that is surrounded by the sub-groove 2124 and the sub-groove 2181, and the other connecting member 323 is rotatably received in the connecting hole 415.

A connecting member 323 of a connector 320 is rotatably received in a groove that is surrounded by the sub-groove 2125 and the sub-groove 2182, and the other connecting member 323 is rotatably received in the connecting hole 515.

A connecting member 323 of a connector 320 is rotatably received in a groove that is surrounded by the sub-groove 2126 and the sub-groove 2183, and the other connecting member 323 is rotatably received in the connecting hole 615.

A connecting member 323 of a connector 320 is rotatably received in a groove that is surrounded by the sub-groove 2127 and the sub-groove 2184, and the other connecting member 323 is rotatably received in the connecting hole 715.

In some embodiments, an identifier 2185 is provided on the periphery of the connecting groove 2171 corresponding to the first component 300, an identifier 2186 is provided on the periphery of the connecting groove 2173 corresponding to the second component 400, an identifier 2187 is provided on the periphery of the connecting groove 2175 corresponding to the third component 500, an identifier 2188 is provided on the periphery of the connecting groove 2177 corresponding to the fourth component 600, and an identifier 2189 is provided on the periphery of the connecting groove 2179 corresponding to the fifth component 700, to facilitate assembling the component to a suitable area of the palm portion 213.

It can be understood that the identifier 2185 provided on the periphery of the connecting groove 2171 may be a square cutout formed on the periphery of the connecting groove 2171. Although the identifier 2185 is a square cut, other identifying signs or techniques may be used in the present disclosure.

It can be understood that the identifier 2186 provided on the periphery of the connecting groove 2173 may be a square cutout formed on the periphery of the connecting groove 2173. Although the identifier 2186 is a square cut, other identifying signs or techniques may be used in the present disclosure.

It can be understood that the identifier 2187 provided on the periphery of the connecting groove 2175 may be a square cutout formed on the periphery of the connecting groove 2175. Although the identifier 2187 is a square cut, other identifying signs or techniques may be used in the present disclosure.

It can be understood that the identifier 2188 provided on the periphery of the connecting groove 2177 may be a square cutout formed on the periphery of the connecting groove 2177. Although the identifier 2188 is a square cut, other identifying signs or techniques may be used in the present disclosure.

It can be understood that the identifier 2189 provided on the periphery of the connecting groove 2179 may be a square cutout formed on the periphery of the connecting groove 2179. Although the identifier 2189 is a square cut, other identifying signs or techniques may be used in the present disclosure.

In some embodiments, the present disclosure can use a proprietary AI algorithm such that the robotic device 200 can learn to understand the gestures required by each amputee. The operating system of the robotic device will adapt and improve with individual use, making the operating system powerful. Specifically, the robotic device 200 can analyze the electrical signals sent by the muscles to intelligently adapt and learn the gestures required by each amputee, thereby mimicking the functions of a human hand with unprecedented accuracy.

The above process creates an unprecedented natural experience and makes the prosthetic limb a natural extension of the user, making the robotic manipulation system highly available.

The structure of the robotic device 200 is simple, so that its cost is low.

The student can construct and perform remote control of the robotic device 200. This is a good starting point for learning robotics and prosthetics. Most importantly, the robotic device 200 can be rebuilt and disassembled for multiple uses, thereby providing a completely customizable learning experience for students of all ages. Based on the same technology we use for our actual prosthetics, our robotic device 200 is a great entry point for students who want to learn robotics, prosthetics and programming.

Students can explore the basics of mechanical, electrical, and computer engineering, use infrared sensors with remote control functions, program-specific gestures and code microcontrollers to operate the movement control mechanism of the robotic device 200, and so on.

As an additional option, a custom glove can be set on the robotic device 200. The glove uses a flexible sensor to read the real-time position of each human finger-like component, enabling students to precisely control the movement of the newly constructed robotic device 200.

Figure 8:
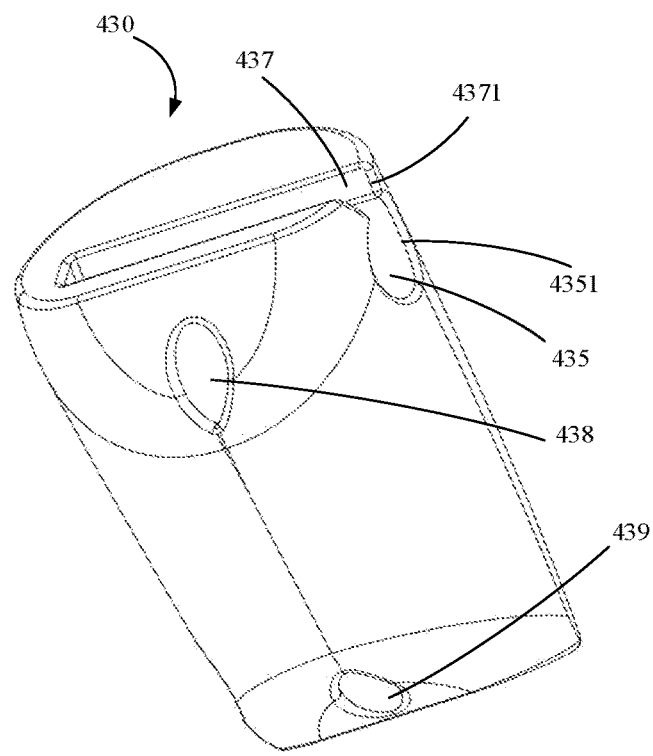
FIG. 8 is a schematic structural view of the intermediate piece shown in FIG. 7 from another angle.
Figure 9:
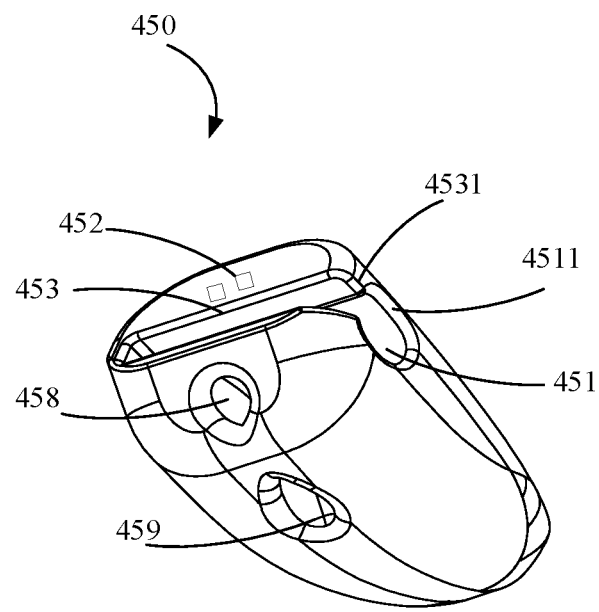
FIG. 9 is a schematic structural diagram of a top piece of a second component of a robotic device according to an embodiment of the present disclosure.
Figure 10:
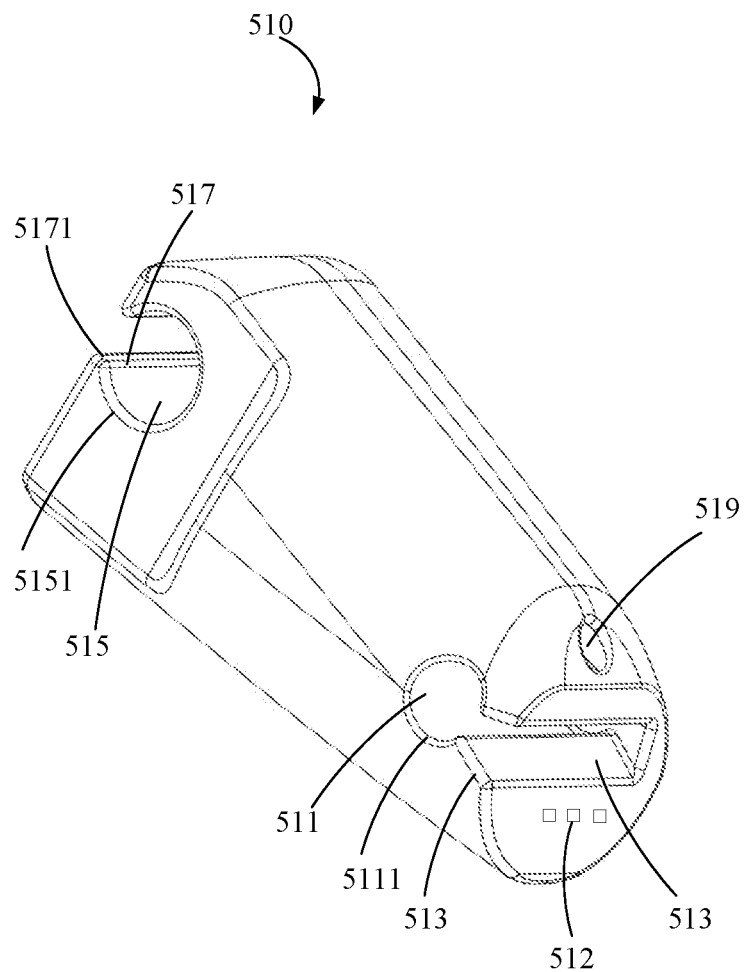
FIG. 10 is a schematic structural diagram of a base piece of a third component of a robotic device according to an embodiment of the present disclosure.
Figure 11:
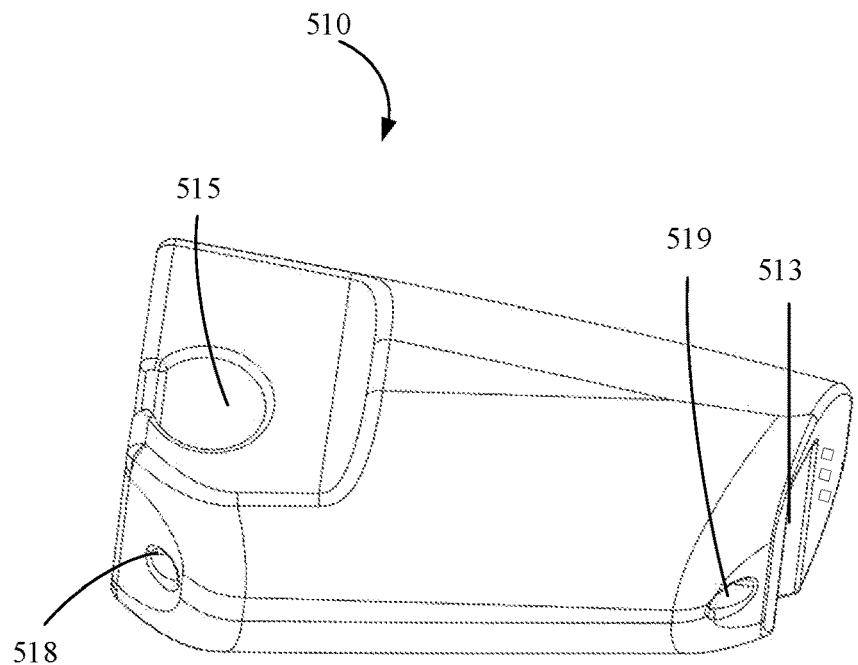
FIG. 11 is a schematic structural view of the base piece shown in FIG. 10 from another angle.
Figure 12:
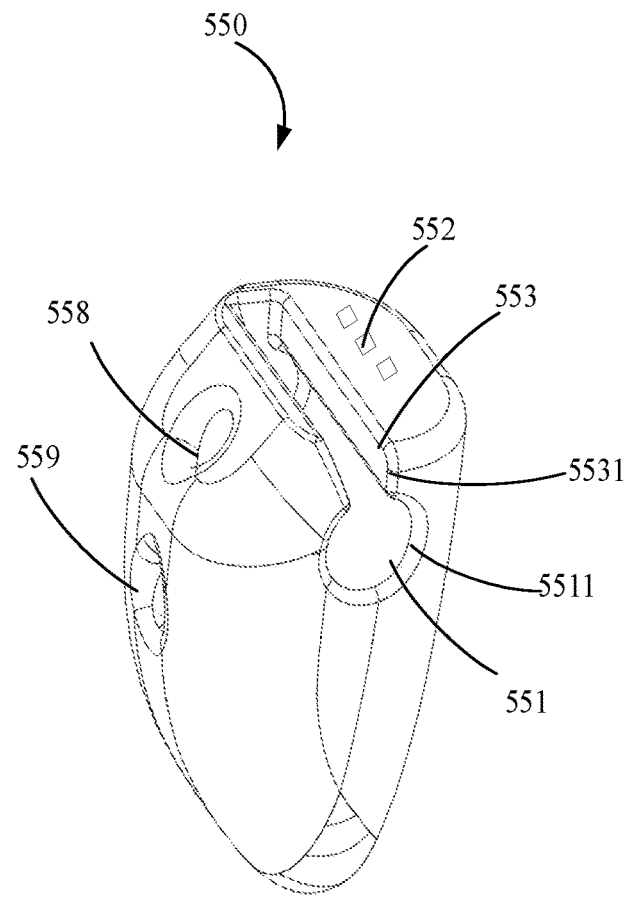
FIG. 12 is a schematic structural diagram of a top piece of a third component of a robotic device according to an embodiment of the present disclosure.
Figure 13:
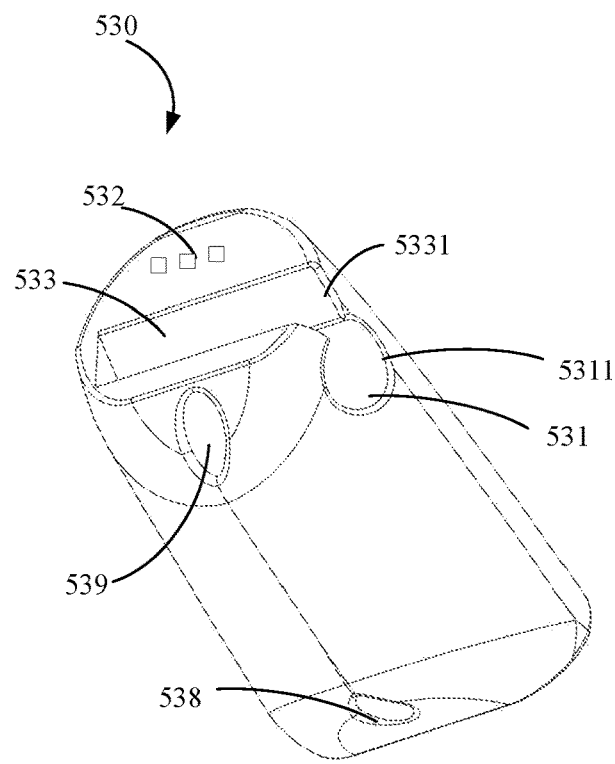
FIG. 13 is a schematic structural diagram of an intermediate piece of a third component of a robotic device according to an embodiment of the present disclosure.
Figure 14:
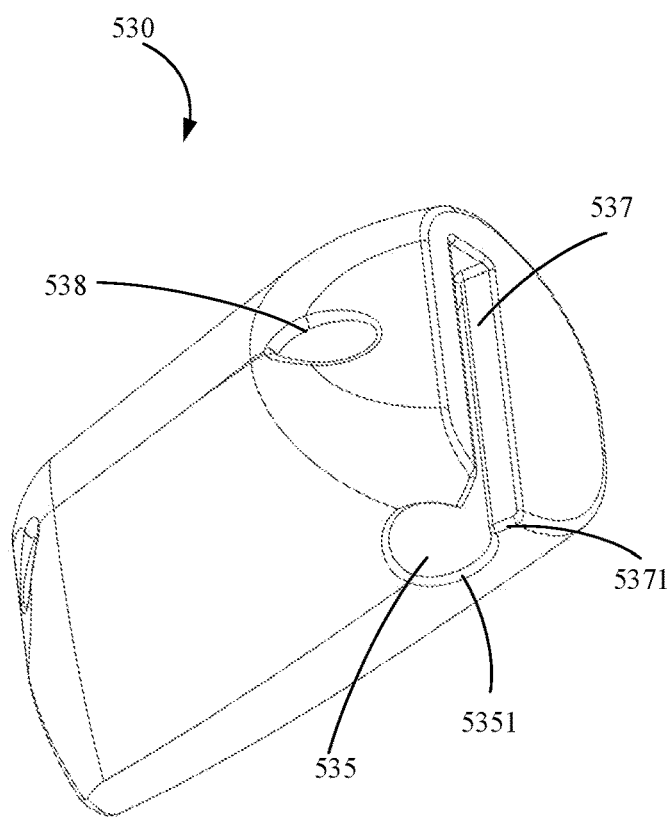
FIG. 14 is a schematic structural view of the intermediate piece shown in FIG. 13 from another angle.
Figure 15:
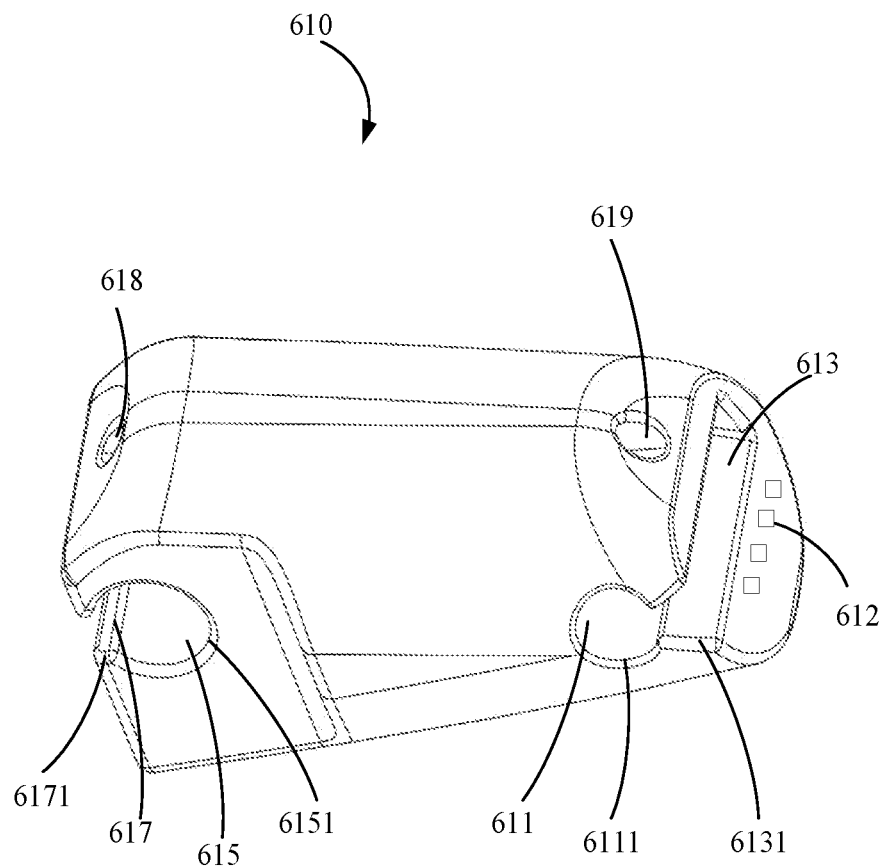
FIG. 15 is a schematic structural diagram of a base piece of a fourth component of a robotic device according to an embodiment of the present disclosure.
Figure 16:
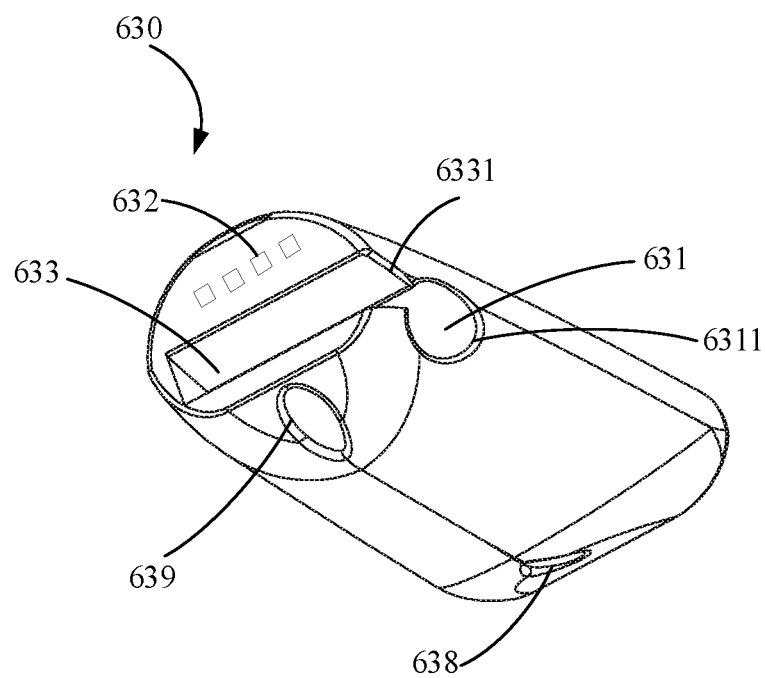
FIG. 16 is a schematic structural diagram of an intermediate piece of a fourth component of a robotic device according to an embodiment of the present disclosure.
Figure 17:
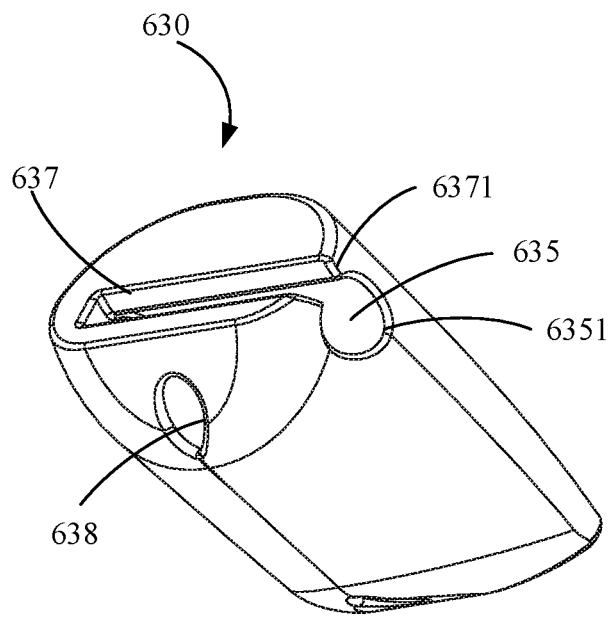
FIG. 17 is a schematic structural view of the intermediate piece shown in FIG. 16 from another angle.
Figure 18:
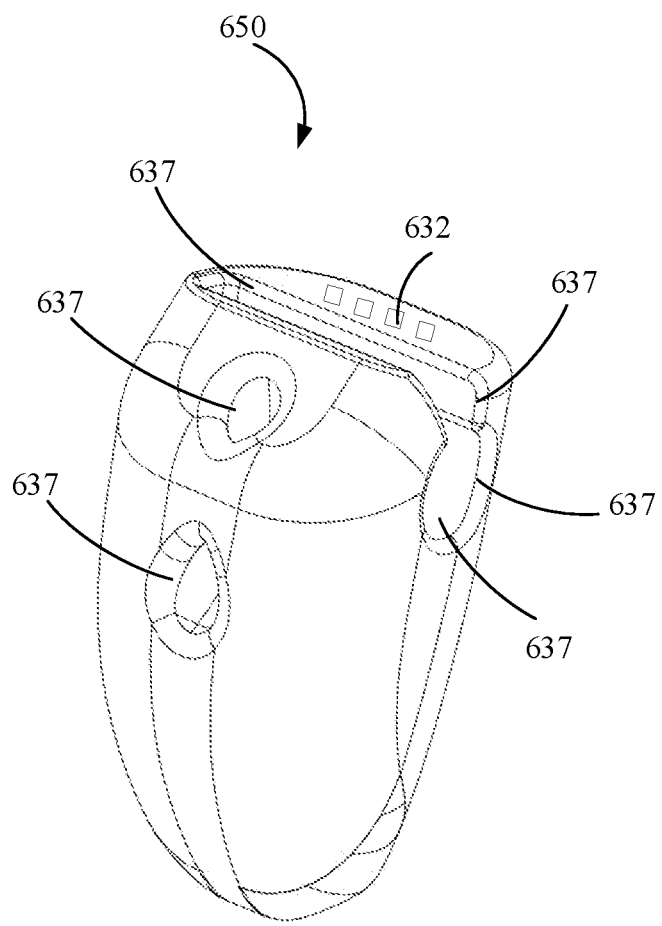
FIG. 18 is a schematic structural diagram of a top piece of a fourth component of a robotic device according to an embodiment of the present disclosure.
Figure 19:
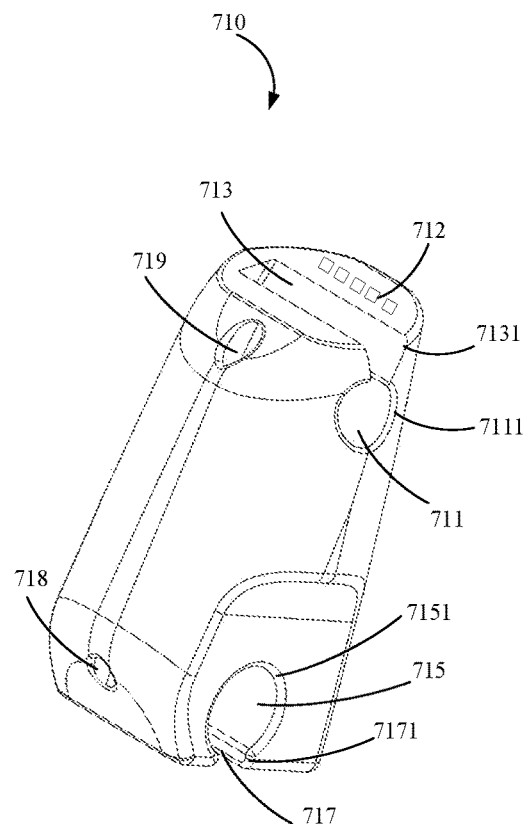
FIG. 19 is a schematic structural diagram of a base piece of a fifth component of a robotic device according to an embodiment of the present disclosure.
Figure 20:
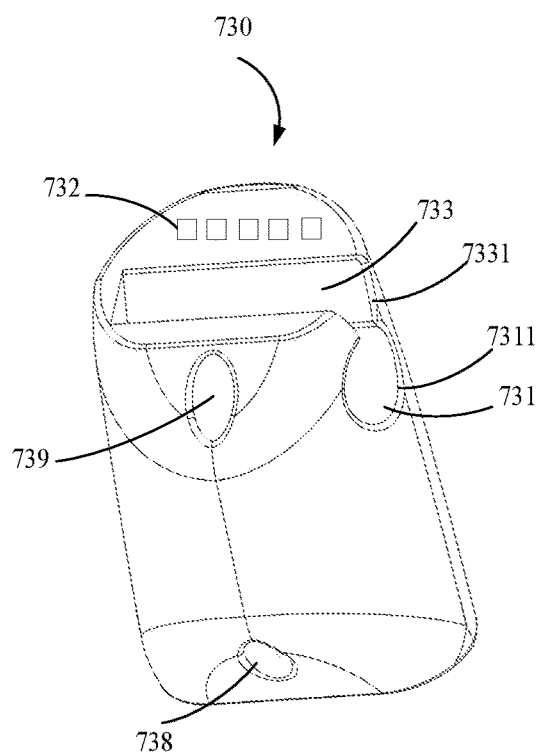
FIG. 20 is a schematic structural diagram of an intermediate piece of a fifth component of a robotic device according to an embodiment of the present disclosure.
Figure 21:
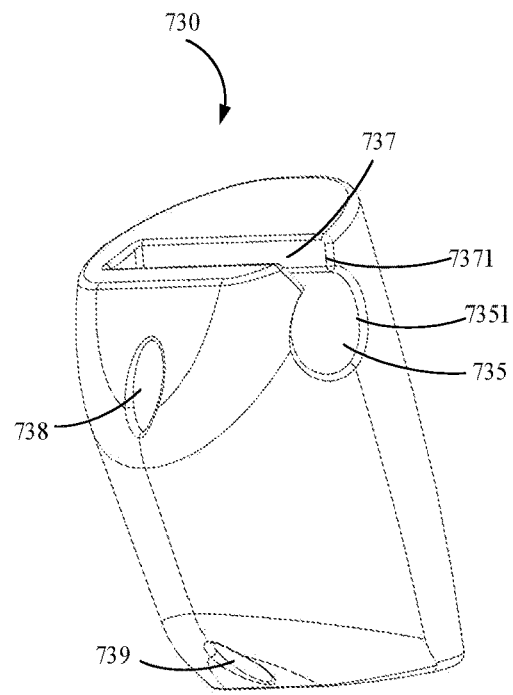
FIG. 21 is a schematic structural view of the intermediate piece shown in FIG. 20 from another angle.
Figure 22:
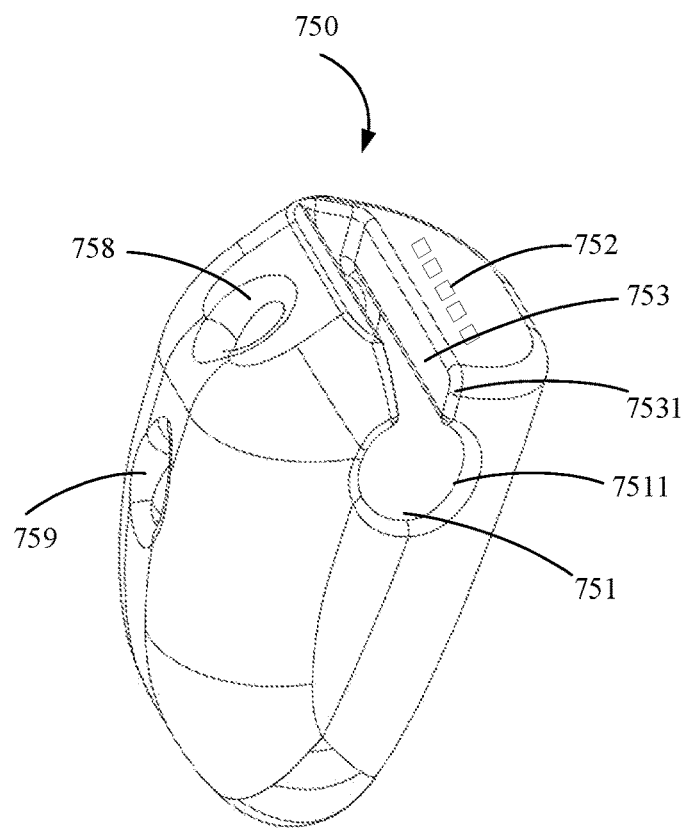
FIG. 22 is a schematic structural diagram of a top piece of a fifth component of a robotic device according to an embodiment of the present disclosure.
Figure 23:
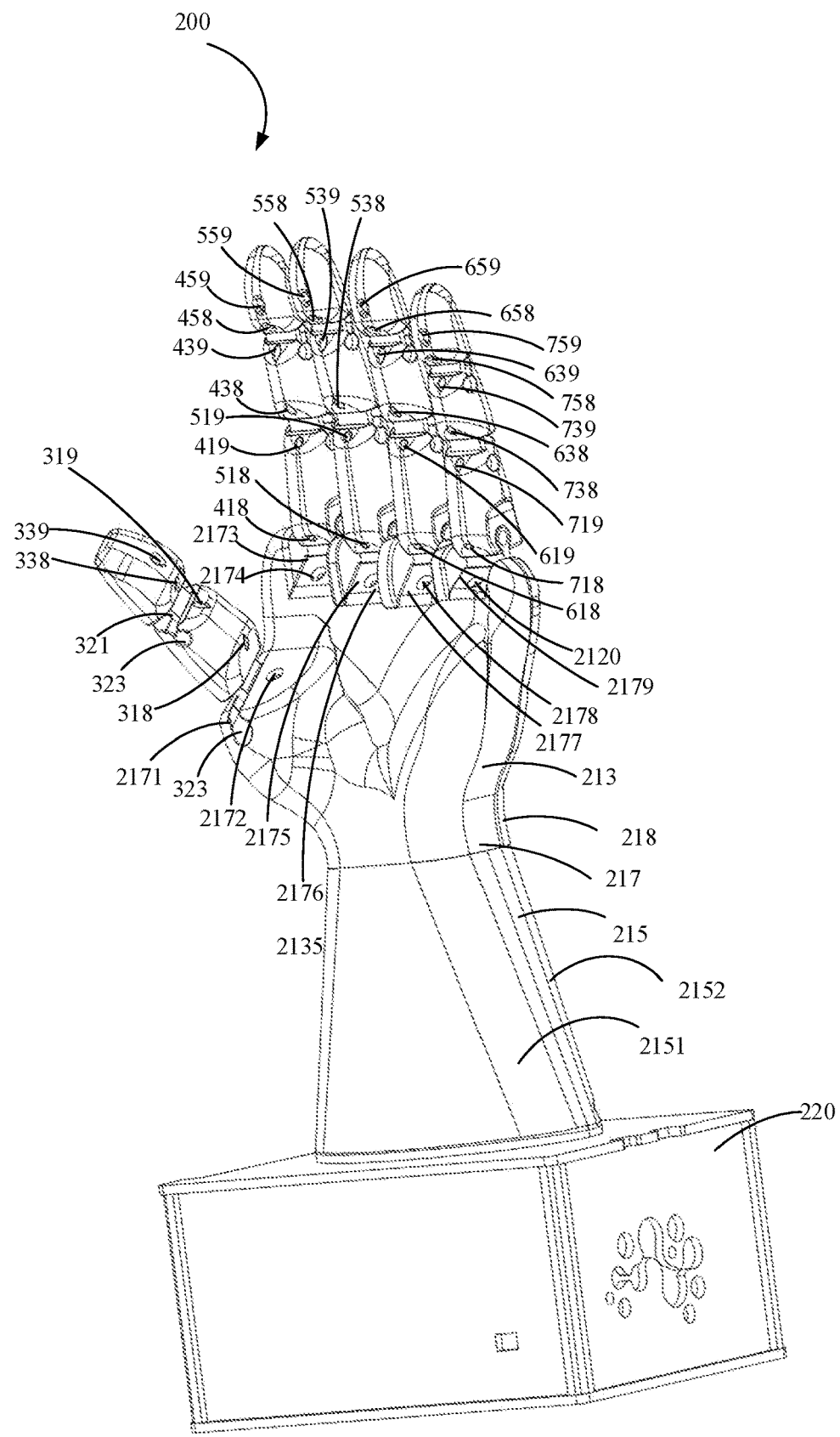
FIG. 23 is a schematic structural diagram of a robotic device according to an embodiment of the present disclosure.
Figure 24:
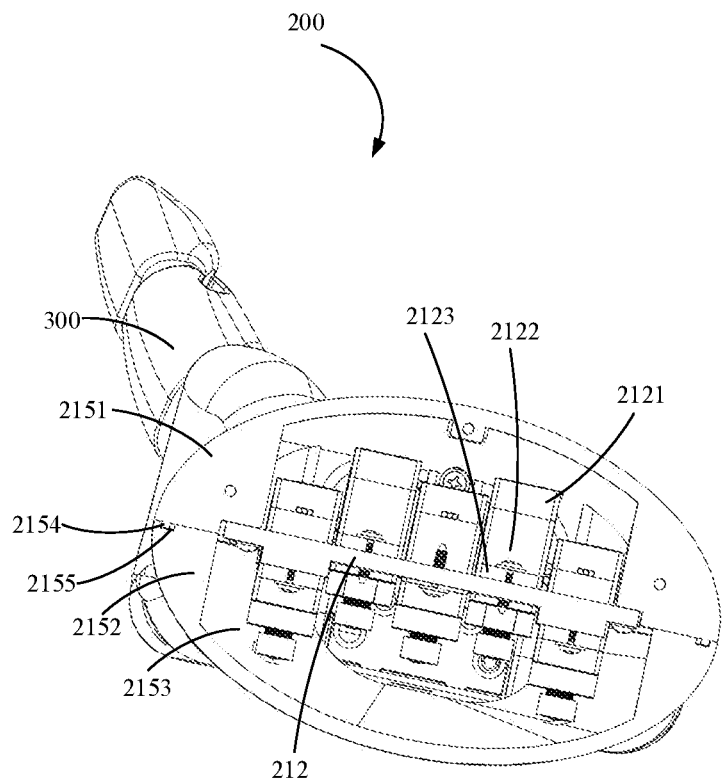
FIG. 24 is a schematic structural view of the robotic device shown in FIG. 23 from another angle.
Figure 25:
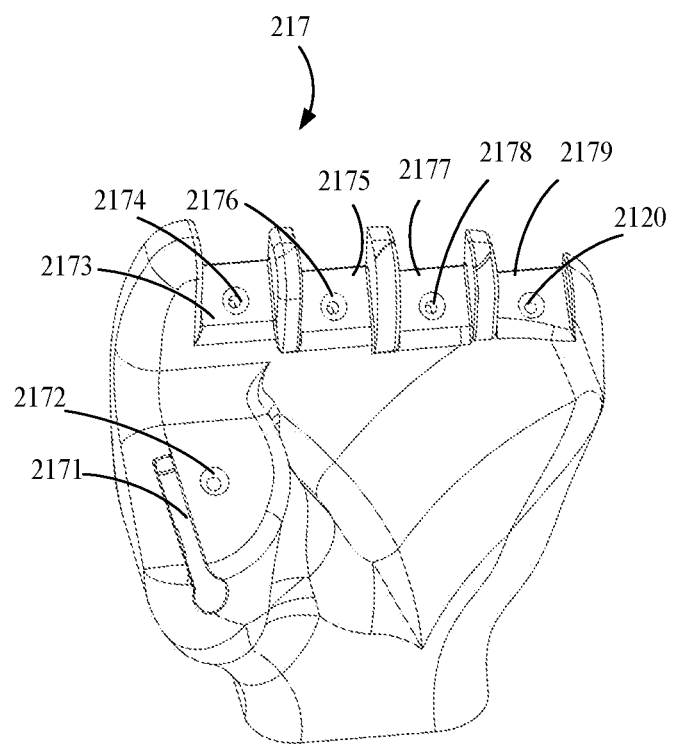
FIG. 25 is a schematic structural diagram of a front palm of a robotic device according to an embodiment of the present disclosure.
Figure 26:
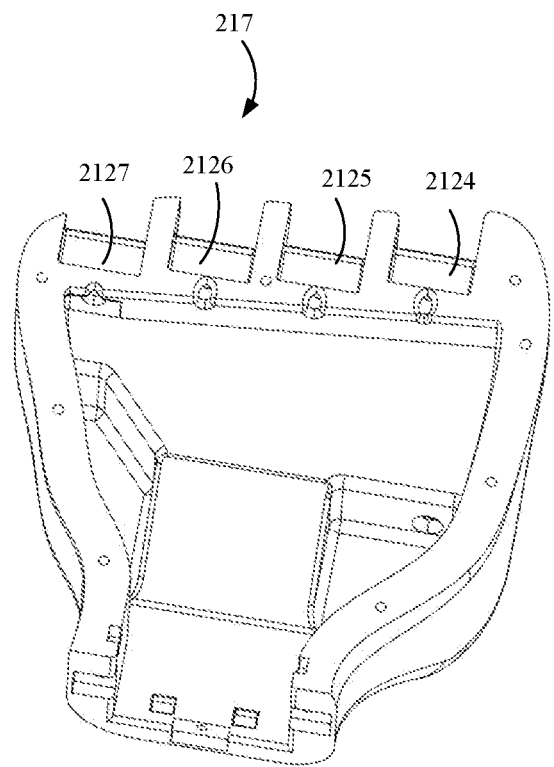
FIG. 26 is a schematic structural view of the front palm shown in FIG. 25 from another angle.
Figure 27:
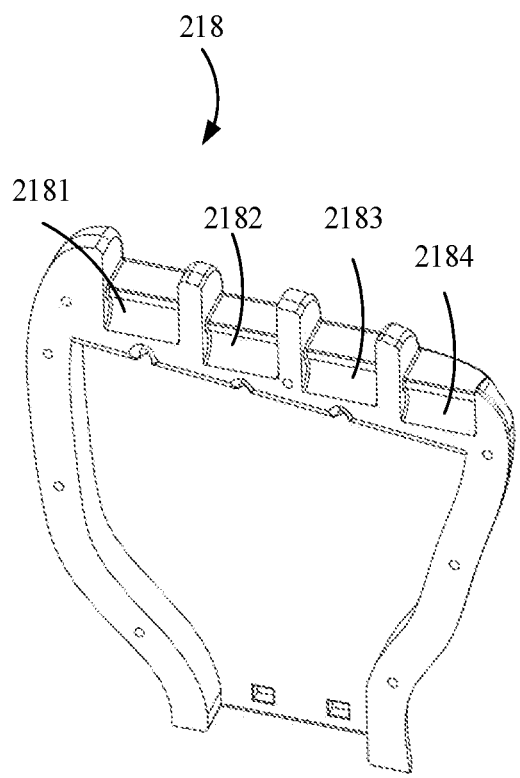
FIG. 27 is a schematic structural diagram of a rear palm of a robotic device according to an embodiment of the present disclosure.
Figure 28:
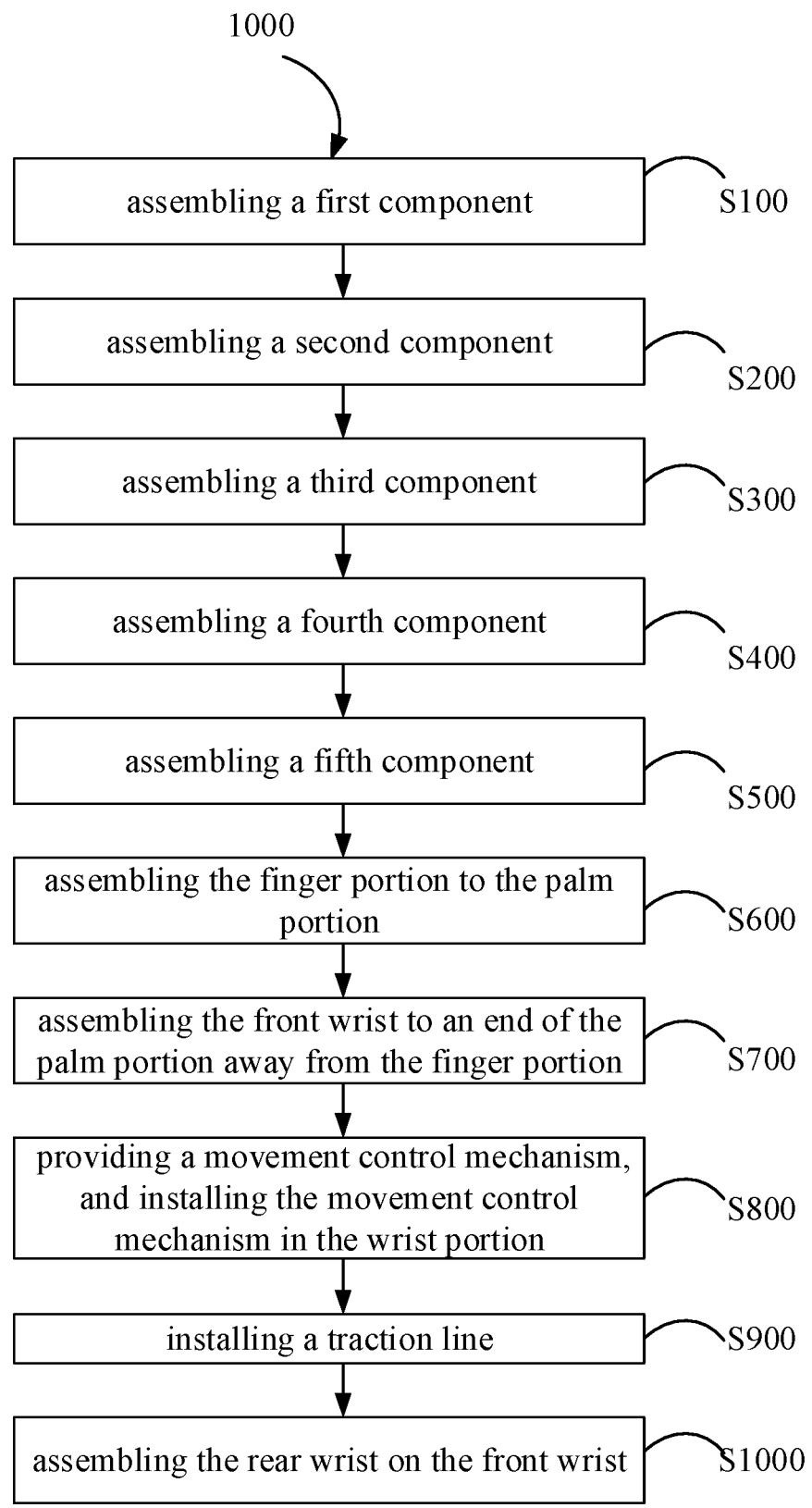
FIG. 28 is a flowchart of a method for assembling a robotic arm according to an embodiment of the present disclosure.

Referring to FIG. 28, which shows a method 1000 for assembling a robotic arm according to an embodiment of the present disclosure. As shown in FIG. 8, the assembled components 400, 500, 600 and 700 can be connected to the palm of the robotic arm 210 using several connectors 320.

The method specifically includes:

Operation S100, assembling a first component 300.

The operation S100 includes: providing a base piece 310, a top piece 330 and a connector 320; passing one of connecting members 323 of the connector 320 through an opening 3111 and an opening 3131 to be rotatably received in a connecting hole 311 entering the base piece 310; passing the other connecting member 323 of the connector 320 through an opening 3331 and an opening 3331 to be rotatably received in a connecting hole 331 entering the top piece 330, to connect the base piece 310 and the top piece 330 through the connector 320, and to obtain the first component 300.

Operation S200, assembling a second component 400.

The operation S200 includes: providing a base piece 410, a second connector 320, an intermediate piece 430 and a top piece 450; passing a connecting member 323 of the connector 320 through an opening 4111 and an opening 4131 to be rotatably received in a connecting hole 411 entering the base piece 410; passing the other connecting piece 323 of the connector 320 through an opening 4311 and an opening 4331 into a connecting hole 431 of the intermediate piece 430; passing the connecting piece 323 of another connector 320 through the opening 4351 and the opening 4353 into the connecting hole 435 of the intermediate piece 430; passing the other connecting piece 323 of the connector 320 through the opening 4511 and the opening 4513 to be rotatably received in the connecting hole 451 entering the top piece 450, to connect the base piece 410, the intermediate piece 430, and the top piece 450 through two connectors 320 to obtain the second component 400.

Operation S300, assembling a third component 500.

The operation S300 includes: providing a base piece 510, a second connector 320, an intermediate piece 530 and a top piece 550; passing a connecting member 323 of the connector 320 through an opening 5111 and an opening 5131 to be rotatably received in a connecting hole 511 entering the base piece 510; passing the other connecting piece 323 of the connector 320 through an opening 5311 and an opening 5331 into a connecting hole 531 of the intermediate piece 530; passing the connecting piece 323 of another connector 320 through the opening 5351 and the opening 5353 into the connecting hole 535 of the intermediate piece 530; passing the other connecting piece 323 of the connector 320 through the opening 5511 and the opening 5513 to be rotatably received in the connecting hole 551 entering the top piece 550, to connect the base piece 510, the intermediate piece 530, and the top piece 550 through two connectors 320 to obtain the third component 500.

Operation S400, assembling a fourth component 600.

The operation S400 includes: providing a base piece 610, a second connector 320, an intermediate piece 630 and a top piece 650; passing a connecting member 323 of the connector 320 through an opening 6111 and an opening 6131 to be rotatably received in a connecting hole 611 entering the base piece 610; passing the other connecting piece 323 of the connector 320 through an opening 6311 and an opening 6331 into a connecting hole 631 of the intermediate piece 630; passing the connecting piece 323 of another connector 320 through the opening 6351 and the opening 6353 into the connecting hole 635 of the intermediate piece 630; passing the other connecting piece 323 of the connector 320 through the opening 6511 and the opening 6513 to be rotatably received in the connecting hole 651 entering the top piece 650, to connect the base piece 610, the intermediate piece 630, and the top piece 650 through two connectors 320 to obtain the fourth component 600.

Operation S500, assembling a fifth component 700.

The operation S500 includes: providing a base piece 710, a second connector 320, an intermediate piece 730 and a top piece 750; passing a connecting member 323 of the connector 320 through an opening 7111 and an opening 7131 to be rotatably received in a connecting hole 711 entering the base piece 710; passing the other connecting piece 323 of the connector 320 through an opening 7311 and an opening 7331 into a connecting hole 731 of the intermediate piece 730; passing the connecting piece 323 of another connector 320 through the opening 7351 and the opening 7353 into the connecting hole 735 of the intermediate piece 730; passing the other connecting piece 323 of the connector 320 through the opening 7511 and the opening 7513 to be rotatably received in the connecting hole 751 entering the top piece 750, to connect the base piece 710, the intermediate piece 730, and the top piece 750 through two connectors 320 to obtain the fifth component 700 and a finger portion 211.

Operation S600, assembling the finger portion 211 to the palm portion 213.

The operation S600 includes: providing the palm portion 213 and several connectors 320; rotatably receiving a connecting member 323 of the connector 320 in the connecting groove 2171 of the palm portion 213, and rotatably receiving another connecting member 323 of the connector 320 in the connecting hole 315 of the first component 300, to rotatably connect the first component 300 with the palm portion 213; rotatably receiving a connecting member 323 of the connector 320 in a groove formed by the sub-groove 2124 and the sub-groove 2181 enclosing together in the palm portion 213, rotatably receiving another connecting member 323 in the connecting hole 415 of the second component 400 to rotatably connect the second component 400 and the palm portion 213; rotatably receiving a connecting member 323 of the connector 320 in a groove formed by the sub-groove 2125 and the sub-groove 2182 enclosing together in the palm portion 213, rotatably receiving another connecting member 323 in the connecting hole 415 of the third component 500 to rotatably connect the third component 500 and the palm portion 213; rotatably receiving a connecting member 323 of the connector 320 in a groove formed by the sub-groove 2126 and the sub-groove 2183 enclosing together in the palm portion 213, rotatably receiving another connecting member 323 in the connecting hole 415 of the fourth component 600 to rotatably connect the fourth component 400 and the palm portion 213; and rotatably receiving a connecting member 323 of the connector 320 in a groove formed by the sub-groove 2127 and the sub-groove 2184 enclosing together in the palm portion 213, rotatably receiving another connecting member 323 in the connecting hole 415 of the fifth component 700 to rotatably connect the fifth component 400 and the palm portion 213.

In some embodiments, the connecting hole 315 and the connecting hole 317 of the base piece 310 both penetrate the surface of the base piece 310 away from the surface of the second component 400, thereby forming an opening 3151 and an opening 3171. One of the connecting member 323 of the connector 320 may pass through the opening 3151, and the connecting plate 321 of the connector 320 may pass through the opening 3171 to rotatably connect the first component 300 and the palm portion 213.

Operation S700, assembling the front wrist 2151 to an end of the palm portion 213 away from the finger portion 211.

In some embodiments, a plurality of mounting holes are provided at an end of the palm portion 213 away from the finger portion 211, the front wrist 2151 is also provided with a plurality of mounting holes, and the palm portion 213 can be connected to the front wrist 2151 through cooperation between the connecting member and the mounting holes. The connecting member may be a screw or the like.

Operation S800, providing a movement control mechanism 212, and installing the movement control mechanism 212 in the wrist portion 2151.

In some embodiments, the movement control mechanism 212 may include a servo board.

In some embodiments, a bracket (not shown) is formed on the front wrist 2151. The bracket is provided with a plurality of mounting holes, such as four mounting holes. The movement control mechanism 212 is also provided with a plurality of mounting holes, such as four mounting holes. The connecting member, such as a screw, passes through the mounting hole on the movement control mechanism 212 and the mounting hole on the bracket to connect the movement control mechanism 212 and the front wrist 2151.

It can be understood that the servo arms 2121 on the movement control mechanism 212 all point upward, that is, towards the direction of the top piece.

Operation S900, installing a traction line.

The S900 includes:

passing the first end of the traction line through the receiving space formed by the front palm 217 and the rear palm 2132 and the receiving cavity 2153 formed by the front wrist 2151 and the rear wrist 2152, to enter the interior of the channel from the through hole 2172 and the entrance 318 of the base piece 310, and then exit the channel from the exit 319 of the base piece 310, then enter the interior of the channel through the inlet 338 of the top piece 330, and then exit the channel through the outlet 339 of the top piece 330, and then tie and fix it; connecting the second end of the traction line to a swing arm corresponding to the first component 300;

passing the first end of the traction line through the receiving space formed by the front palm 217 and the rear palm 2132 and the receiving cavity 2153 formed by the front wrist 2151 and the rear wrist 2152, to enter the interior of the channel from the through hole 2174 and the entrance 418 of the base piece 410, and then exit the channel from the exit 419 of the base piece 410, then enter the interior of the channel through the inlet 438 of the top piece 430, then exit the channel from the outlet 439 of the intermediate piece 430, then enter the interior of the channel from the inlet 458 of the top piece 450, and then exit the channel from the outlet 459 of the top piece 450. and then tie and fix it; connecting the second end of the traction line to a swing arm corresponding to the second component 400;

passing the first end of the traction line through the receiving space formed by the front palm 217 and the rear palm 2132 and the receiving cavity 2153 formed by the front wrist 2151 and the rear wrist 2152, to enter the interior of the channel from the through hole 2176 and the entrance 518 of the base piece 510, and then exit the channel from the exit 519 of the base piece 510, then enter the interior of the channel through the inlet 538 of the top piece 530, then exit the channel from the outlet 539 of the intermediate piece 530, then enter the interior of the channel from the inlet 558 of the top piece 550, and then exit the channel from the outlet 559 of the top piece 550, and then tie and fix it; connecting the second end of the traction line to a swing arm corresponding to the third component 500;

passing the first end of the traction line through the receiving space formed by the front palm 217 and the rear palm 2132 and the receiving cavity 2153 formed by the front wrist 2151 and the rear wrist 2152, to enter the interior of the channel from the through hole 2178 and the entrance 618 of the base piece 610, and then exit the channel from the exit 619 of the base piece 610, then enter the interior of the channel through the inlet 638 of the top piece 630, then exit the channel from the outlet 639 of the intermediate piece 630, then enter the interior of the channel from the inlet 658 of the top piece 650, and then exit the channel from the outlet 659 of the top piece 650, and then tie and fix it; connecting the second end of the traction line to a swing arm corresponding to the fourth component 600;

passing the first end of the traction line through the receiving space formed by the front palm 217 and the rear palm 2132 and the receiving cavity 2153 formed by the front wrist 2151 and the rear wrist 2152, to enter the interior of the channel from the through hole 2120 and the entrance 718 of the base piece 710, and then exit the channel from the exit 719 of the base piece 710, then enter the interior of the channel through the inlet 738 of the top piece 730, then exit the channel from the outlet 739 of the intermediate piece 730, then enter the interior of the channel from the inlet 758 of the top piece 750, and then exit the channel from the outlet 759 of the top piece 750, and then tie and fix it; connecting the second end of the traction line to a swing arm corresponding to the fifth component 700.

Operation S1000, assembling the rear wrist 2152 on the front wrist 2151.

In some embodiments, the front wrist 2151 and the back wrist 2152 together form a receiving cavity 2153, and the movement control mechanism 212 is received in the receiving cavity 2153.

It can be understood that, when knotting, you can knot twice to increase strength and ensure that all the traction lines are tight and straight.

In some embodiments, the step of cutting away excess traction lines is also included.

In some embodiments, the lines of the movement control mechanism, that is, the lines corresponding to the five components, are put together and adhered with tape. The glued line is introduced into the second controller 220 and communicates with the second controller 220.

It can be understood that, the traction line may be a line or a string. The material of the traction line includes, but is not limited to, nylon, plastic, rubber, metal, and the like.

The above-mentioned assembly method is simple, and the robotic device 200 is detachable.

The above are only preferred embodiments of the present disclosure and are not intended to limit the present disclosure. It will be apparent to those skilled in the art that various modifications and variations can be made in the present disclosure. Any modification, equivalent replacement, or improvement made within the spirit and principle of the present disclosure shall be included in the protection scope of the present disclosure.

What is claimed is:

1. A system for manipulating a robotic device, comprising:
    a human interface device for obtaining information associated with a position and/or a movement of a user's finger using the human interface device; and
    a robotic device for simulating the position and/or movement of the user's finger in real time,
    wherein:
    the robotic device is in communication with the human interface device;
    the human interface device comprises a glove sleeved on the robotic device, the glove comprises a plurality of sensors for obtaining the information associated with the position and/or movement of the user's finger;
    the glove comprises a first processor, and the robotic device comprises a second processor in communication with the first processor of the glove;
    the robotic device comprises a robotic arm and a movement controller, the robotic arm is provided with a plurality of components similar to the user's fingers, and the movement controller is configured to control movements of the plurality of components in response to a signal generated by the second processor;
    the movement controller comprises a plurality of swing arms, a plurality of motors for driving the swing arms, and a plurality of traction lines connected to the swing arms; and
    each traction line, each swing arm and each motor are connected to a corresponding component similar to the finger.

2. The system of claim 1, wherein the robotic device is manufactured by 3D printing technology.

3. A method for manipulating a robotic device, applied to a system for manipulating the robotic device, the system comprising: a human interface device for obtaining information associated with a position and/or a movement of a user's finger using the human interface device; and a robotic device for simulating the position and/or movement of the user's finger in real time,
    wherein:
    the robotic device being in communication with the human interface device;

the human interface device comprising a glove sleeved on the robotic device, the glove comprises a plurality of sensors for obtaining the information associated with the position and/or movement of the user's finger;

the glove comprises a first processor, and the robotic device comprises a second processor in communication with the first processor of the glove;

the robotic device comprises a robotic arm and a movement controller, the robotic arm is provided with a plurality of components similar to the user's fingers, and the movement controller is configured to control movements of the plurality of components in response to a signal generated by the second processor;

the movement controller comprises a plurality of swing arms, a plurality of motors for driving the swing arms, and a plurality of traction lines connected to the swing arms; and each traction line, each swing arm and each motor are connected to a corresponding component similar to the finger, wherein the method comprises:

obtaining information associated with the position and/or movement of the user's finger using the human interface device through the human interface device; and simulating the position and/or movement of the user's finger in real time through the robotic device.

4. The method of claim 3, further comprising:

sleeving the glove on the robotic device; and obtaining the information associated with the position and/or movement of the user's finger through the glove.

5. The method of claim 3, wherein the robotic device is manufactured by 3D printing technology.

\* \* \* \* \*